(12) United States Patent  
Yamazaki et al.

(10) Patent No.: US 8,031,214 B2
(45) Date of Patent: Oct. 4, 2011

(54) LINE HEAD AND IMAGE FORMING APPARATUS INCORPORATING THE SAME

(75) Inventors: Katsunori Yamazaki, Nagano (JP); Yujiro Nomura, Nagano (JP); Kiyoshi Tsujino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 917 days.

(21) Appl. No.: 12/024,008

(22) Filed: Jan. 31, 2008

(65) Prior Publication Data

US 2008/0150849 A1 Jun. 26, 2008

Related U.S. Application Data

(63) Continuation of application No. 10/946,626, filed on Sep. 21, 2004, now Pat. No. 7,425,971.

(30) Foreign Application Priority Data

Sep. 22, 2003 (JP) .................. 2003-329493
Sep. 25, 2003 (JP) .................. 2003-332885
Sep. 25, 2003 (JP) .................. 2003-332886
Sep. 25, 2003 (JP) .................. 2003-332887

(51) Int. Cl.
*G03G 15/043* (2006.01)

(52) U.S. Cl. ........................ 347/132; 347/237
(58) Field of Classification Search .............. 347/130, 347/132, 142, 145, 237, 247
See application file for complete search history.

(56) References Cited

U.S. PATENT DOCUMENTS

| 4,596,995 | A | 6/1986 | Yamakawa et al. | |
|---|---|---|---|---|
| 5,671,002 | A | 9/1997 | Murano | |
| 6,121,994 | A | * 9/2000 | Kuribayashi et al. | 347/237 |
| 6,323,890 | B1 | 11/2001 | Muto et al. | |
| 6,573,920 | B2 | 6/2003 | Shimoda et al. | 347/129 |
| 6,750,895 | B1 | 6/2004 | Otose et al. | |
| 7,538,784 | B2 * | 5/2009 | Yamazaki et al. | 347/132 |
| 7,719,554 | B2 * | 5/2010 | Yamazaki et al. | 347/132 |
| 7,733,360 | B2 * | 6/2010 | Yamazaki et al. | 347/132 |
| 2004/0174426 | A1 | 9/2004 | Nomura et al. | |

FOREIGN PATENT DOCUMENTS

| JP | 60006472 A | 1/1985 |
|---|---|---|
| JP | 01218860 A | 9/1989 |
| JP | 02088259 A | 3/1990 |
| JP | 3-101366 | 4/1991 |
| JP | 4-363264 | 12/1992 |
| JP | 05008443 A | 1/1993 |
| JP | 5-124261 | 5/1993 |
| JP | 05210286 A | 8/1993 |
| JP | 05270052 A | 10/1993 |
| JP | 6-003751 | 1/1994 |
| JP | 6-246969 | 9/1994 |

(Continued)

OTHER PUBLICATIONS

Translation of JP-02008259, published on Mar. 1990.*

*Primary Examiner* — Huan Tran
(74) *Attorney, Agent, or Firm* — DLA Piper LLP (US)

(57) ABSTRACT

In a line head, a plurality of element arrays arranged in a first direction. Each array includes a plurality of light emission elements arrayed in a second direction which is perpendicularly to the first direction. The light emission elements emit light for forming an electrostatic latent image on a photosensitive surface of an image carrier. A switcher activates the light emission elements in at least one of the element arrays while deactivating the others. A developer develops the latent image as a visible image with toner.

8 Claims, 16 Drawing Sheets

FOREIGN PATENT DOCUMENTS

| | | |
|---|---|---|
| JP | 6-336054 | 12/1994 |
| JP | 8-104027 | 4/1996 |
| JP | 10035004 A | 2/1998 |
| JP | 11028834 A | 2/1999 |
| JP | 11-058814 | 3/1999 |
| JP | 11254738 A | 9/1999 |
| JP | 2000-071508 | 3/2000 |
| JP | 2000-094745 | 4/2000 |
| JP | 2000190567 A | 7/2000 |
| JP | 2001096798 A | 4/2001 |
| JP | 2001-260411 | 9/2001 |
| JP | 2001284653 A | 10/2001 |
| JP | 2003-001864 | 1/2003 |
| JP | 2003025632 A | 1/2003 |
| JP | 2003205647 A | 7/2003 |
| JP | 2003-341140 | 12/2003 |

* cited by examiner

FIG. 14

LINE HEAD AND IMAGE FORMING APPARATUS INCORPORATING THE SAME

CROSS-REFERENCE TO THE RELATED APPLICATIONS

This application is a continuation of application Ser. No. 10/946,626 filed on Sep. 21, 2004, the entire contents of which are incorporated by reference. This application also claims benefit of priority under 35 U.S.C. §119 to Japanese Patent Application No. 2003-329493 filed Sep. 22, 2003, Japanese Patent Application No. 2003-332885 filed Sep. 25, 2003, Japanese Patent Application No. 2003-332886 filed Sep. 25, 2003 and Japanese Patent Application No. 2003-332887 filed Sep. 25, 2003, the entire contents of all of which are incorporated by reference.

BACKGROUND OF THE INVENTION

The present invention relates to a line head in which a plurality of light emission elements are arrayed is used as an exposer for forming a latent image to be developed, which is incorporated in an image forming apparatus using an electrophotographic process.

Japanese Patent Publication No. 4-363264A discloses a line head in which a plurality of electroluminescence (EL) elements are arrayed to form a single line, and teaches that an interval between pulses for driving the elements to emit light is controlled so as to elongate the life of the elements. Japanese Patent Publication No. 3-101366A discloses a line head in which a number of EL elements are arrayed to form a single line, one auxiliary pulse for driving all the elements to emit light is necessarily incorporated irrespective of main driving pulses in each primary scanning operation, so that predetermined light intensity can be obtained in a short time even when the devices have not emitted light for a long time.

FIG. 20 shows one example of a time-to-luminance characteristic of an EL element. The abscissa is used for a time (minutes) and the ordinate is used for luminance. As is shown, luminance decreases with an elapse of time since the EL element has activated (by about 20% in five minutes). The luminance is restored if the EL element is deactivated for a predetermined time period to decrease the element temperature, and is activated again. To simplify the explanation, the deactivated period is omitted from FIG. 20.

Each of the line heads disclosed in the above publications is provided with a single array of the EL elements. Hence, if such a line head is subjected to continuous activation for a long time period, the luminance decreases as shown in FIG. 20, thereby deteriorating the quality of an image to be obtained. In addition, since the degree of the luminance decrease in one element is actually different from another element, the deterioration of the obtained image quality becomes remarkable after the long-term activation. Further, since the life of the EL element is shortened by such a continuous activation, the replacement of the line head is hastened.

Moreover, at the occurrence of an unexpected event due to a failure in any of the light emission elements or the like, the line head has to be replaced, which poses a problem that the replacement is tedious and the cost is thereby increased.

SUMMARY OF THE INVENTION

It is therefore an object of the invention to provide a line head capable of addressing such an unexpected event, avoiding such image deterioration due to the long-term activation, and prolonging the lifetime thereof.

It is also an object of the invention to provide an image forming apparatus incorporating such a line head.

In order to achieve the above objects, according to the invention, there is provided a line head, comprising:

a plurality of element arrays arranged in a first direction, each array including a plurality of light emission elements arrayed in a second direction which is perpendicularly to the first direction; and a first switcher, which activates the light emission elements in at least one of the element arrays while deactivating the others.

Preferably, at least one of the element arrays is used for a backup purpose. In this case, the image forming operation can be continued without replacing the line head, even if a failure is occurred on one of the element arrays.

Preferably, each of the element arrays is divided into a plurality of blocks; and the line head further comprises a second switcher which activates the light emission elements in at least one of the blocks in the at least one element array activated by the first switcher.

In this case, since only the block in the element array can be activated in accordance with the required area of the image formation, economic light emission can be realized.

Here, it is preferable that a third switcher activates at least one of the light emission elements in the at least one block activated by the second switcher.

In this case, the activation/deactivation and the activated time period of the respective light emission elements can be independently controlled.

Alternatively, the second switcher may activate at least one of the light emission elements in the at least one element array activated by the first switcher.

Preferably, each of the light emission elements is provided as either an organic electroluminescence element or a light emitting diode.

In the former case, since the organic electroluminescence element can be controlled statically, the control system can be simplified. In the latter case, the manufacturing process for the light emission element can be simplified.

Here, it is preferable that the first switcher controls a potential at one of a cathode or an anode of each of the light emission elements. Here, a potential at the other one of the cathode or the anode is fixed. In this case, the switching operation can be simplified.

Preferably, the first switcher comprises switching transistors. In this case, the switching between the element arrays can be executed rapidly and accurately.

Here, it is preferable that: each of the element arrays is associated with one of the switching transistors; and the first switcher simultaneously generates a first signal for activating the switching transistor and a second signal for deactivating the switching transistor; so that the first signal is inputted to the switching transistor for the at least one element arrays to be deactivated, while the second signal is inputted to the switching transistor for the others to be deactivated.

In this case, the signal generation for the switching between the element arrays can be simplified.

Alternatively, it is preferable that the element arrays includes at least one first element array and at least one second element array; the switching transistors includes a first transistor associated with the first element array and a second transistor associated with the second element array and having a conductive type which is opposite to the first transistor; and the first switcher inputs a common signal to the first transistor and the second transistor, so that one of the first transistor and the second transistor is activated while the other one is deactivated.

In this case, the wiring for providing the signals for switching between the element arrays can be simplified.

Preferably, the first switcher sequentially activate at least one of the element arrays when a predetermined requirement is satisfied.

In this case, the image forming operation can be continued without replacing the line head, even if the luminance of the light emission element in the activated element array decreases due to the long-term continuous activation.

Preferably, the first switcher sequentially activate at least one of the element arrays with a predetermined order.

In this case, since each of the element arrays intermittently activated, not only the luminance decrease of the light emission element due to the long-term continuous activation can be avoided, but also the lifetime of the line head can be prolonged.

Preferably, the first switcher sequentially activate at least one of the element arrays in accordance with an image to be formed.

In this case, for example, the element array in which the luminance of the light emission elements decreases can be used for an image with less data such as a binary data image. Accordingly, not only the deterioration of the obtained image quality can be avoided, but also the lifetime of the line head can be prolonged.

Here, it is preferable that the element arrays includes at least one first element array for forming a binary data image, and at least one second element array for forming a gradation data image.

In this case, the element array in which the luminance of the light emission elements decreases can be used to form the binary data image to maintain the obtained image quality.

Alternatively, it is preferable that the element arrays includes at least one first element array capable of forming both of a binary data image and a gradation image, and at least one second element array for forming only the gradation data image.

In this case, the restoration of the decreased luminance of the light emission elements in the first element array can be secured without stopping the image forming operation because the first array may be used to form the binary data image until the luminance is restored to a level enough to form the gradation data image.

According to the invention, there is also provided an image forming apparatus, comprising:
  an image carrier, having a photosensitive surface;
  a line head, comprising:
  a plurality of element arrays arranged in a first direction, each array including a plurality of light emission elements arrayed in a second direction which is perpendicularly to the first direction, to emit light for forming an electrostatic latent image on the photosensitive surface; and
  a first switcher, which activates the light emission elements in at least one of the element arrays while deactivating the others; and
  a developer, which develops the latent image as a visible image with toner.

BRIEF DESCRIPTION OF THE DRAWINGS

The above objects and advantages or the present invention will become more apparent by describing in detail preferred exemplary embodiments thereof with reference to the accompanying drawings, wherein:

FIG. 14 is a table for explaining an operation of the line head of FIG. 12;

DETAILED DESCRIPTION OF THE INVENTION

Embodiments of the invention will be described below in detail with reference to the accompanying drawings.

Figure 10:
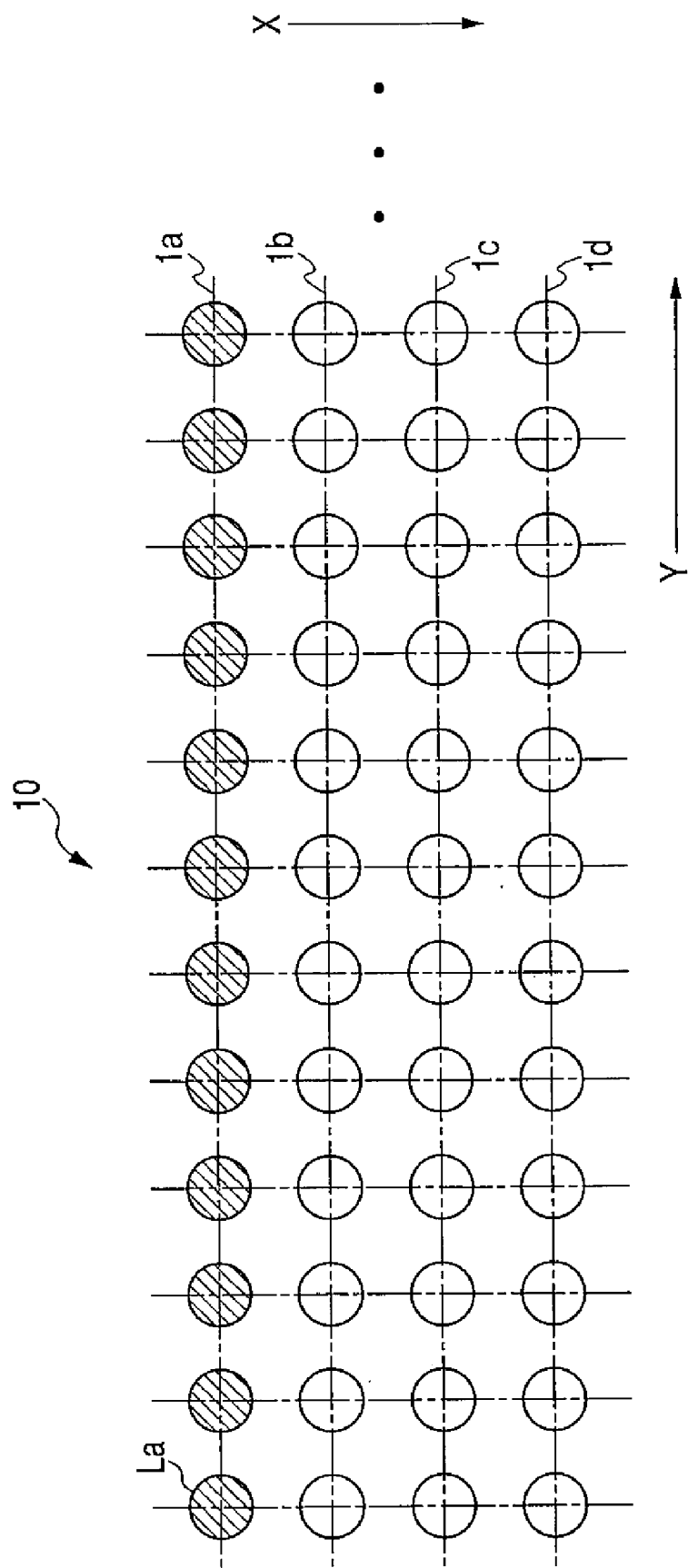
FIG. 10 is a diagram of a line head according to an eighth embodiment of the invention.

As shown in FIG. 10, in a line head 10 according to a first embodiment of the invention, a number of light emission elements La are arrayed in a primary scanning direction (X direction) to form an element array, and a plurality of elements arrays 1a through 1d are arranged in a secondary scanning direction (Y-direction). Beside the EL element, a light emitting diode (LED) can be adopted as the light emission element La.

In this embodiment, the element arrays 1b through 1d are provided as the element arrays for a backup operation. When the light emission elements La in the element array 1a for a normal operation have been activated for a predetermined time, the element array 1b for a backup operation is caused to emit light.

As described the above, the element array provided for the backup operation is not limited to one array. The element array 1c can be used as the backup array for the element array 1b. Similarly, the element array 1c can be used as the backup array for the element array 1c. The arrays 1c and 1d may be used for arrays for performing multiple exposure.

The line head of the invention is configured such that at least one array among a plurality of arrays arranged in the secondary scanning direction is used for the backup operation. In a case where three arrays of EL elements are provided, at least one array is used for the backup operation. That is, one array may be used as a normal operation while two arrays may be used as the backup operation. Alternatively, two arrays may be used as the normal operation while one array may be used as the backup operation.

Figure 1:
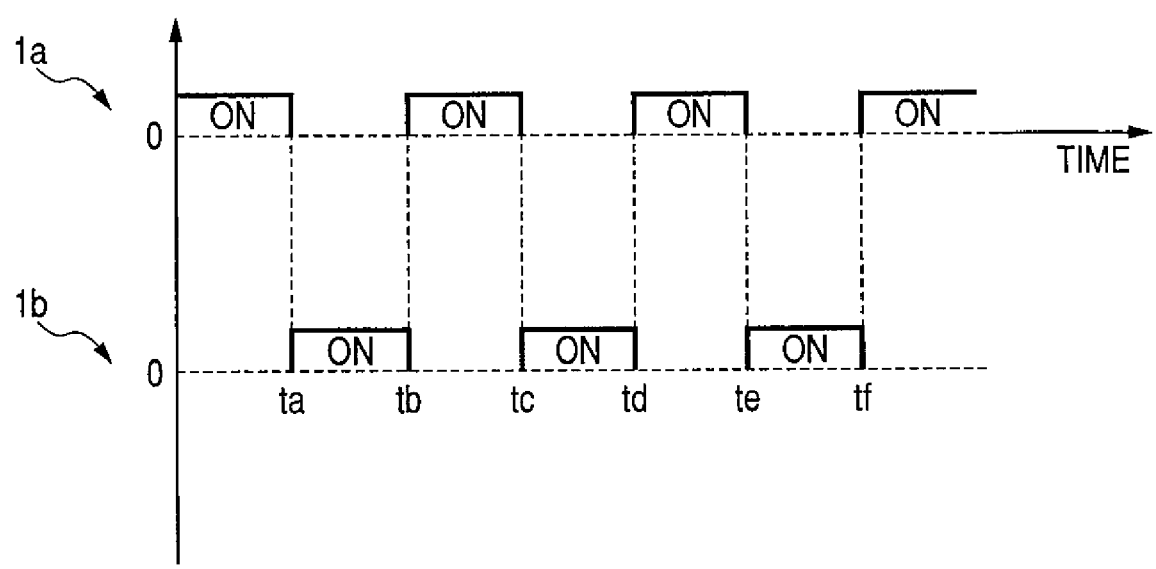
FIG. 1 is a diagram for explaining an operation of a line head according to a first embodiment of the invention.

FIG. 1 shows how to operate the line head 10 in this embodiment. In order to simplify the explanation, there will be described a case where only the two arrays 1a and 1b are operated. In this case, all the light emission elements in the element array 1a are activated from the time points 0 to ta. All the light emission elements in the element array 1b are deactivated. At the time point ta, the element array 1a is deactivated, and switching is made for the element array 1b to be activated. Thereafter, the element array 1a and the element array 1b are activated alternately at the time points tb, tc, td, te, and tf.

Since the two element arrays are alternately activated at a predetermined cycle so that each element array is intermittently activated, the luminance decrease due to the long term continuous activation can be avoided. Hence, not only can deterioration of the obtained image quality be prevented, but also the life of the line head can be prolonged.

The switching timings for the respective element arrays, that is, the activation time period and the deactivation time period, are set by taking various factors into account. In other words, optimal timings are set on the basis of a temperature characteristic of light emission element materials, a heat-releasing characteristic of a panel of the line head to which the light emission elements are attached, etc.

Figure 2:
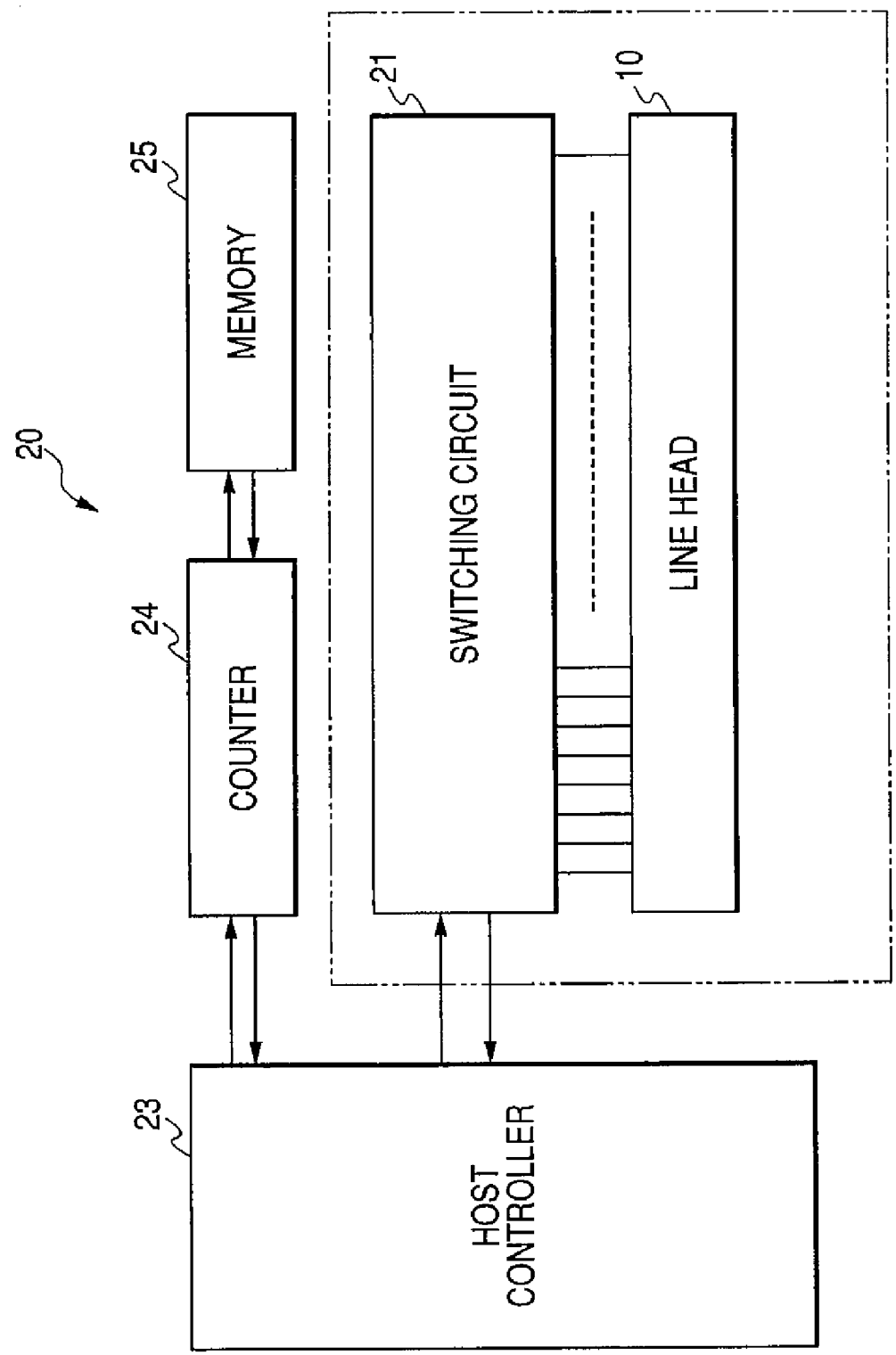
FIG. 2 is a block diagram of a peripheral configuration of the line head of FIG. 1.

As shown in FIG. 2, the line head 10 is incorporated in a control section 20 of an image forming apparatus. A host controller 23 for generating image data, which is constituted by a computer, for example, is connected to the image forming apparatus. The control section 20 comprises a switching circuit 21, a counter 24, and a memory 25 in addition to the line head 10. The counter 24 counts the activated time period of each element array and stores the counted value into the memory 25. The memory 25 stores the prescribed switching timing in advance.

The host controller 23 judges whether the activated time period of one element array reaches the switching timing stored in the memory 26. If it reaches, a switching signal is transmitted to the switching, circuit 21 to deactivate the one element array while activating another element array in the line head 10.

In this embodiment, the host controller 23 controls the counter 24 and the memory 25. However, a controller such as a CPU for controlling the counter 24 and the memory 25 may be provided in the control section 20, such that the controller is formed on a substrate on which the switching circuit 21 is provided. In this case, the configuration of the control system can be compact and the host controller 23 is not involved. Hence, the wiring can be shorter, which can in turn increase the processing speed.

Figure 3:
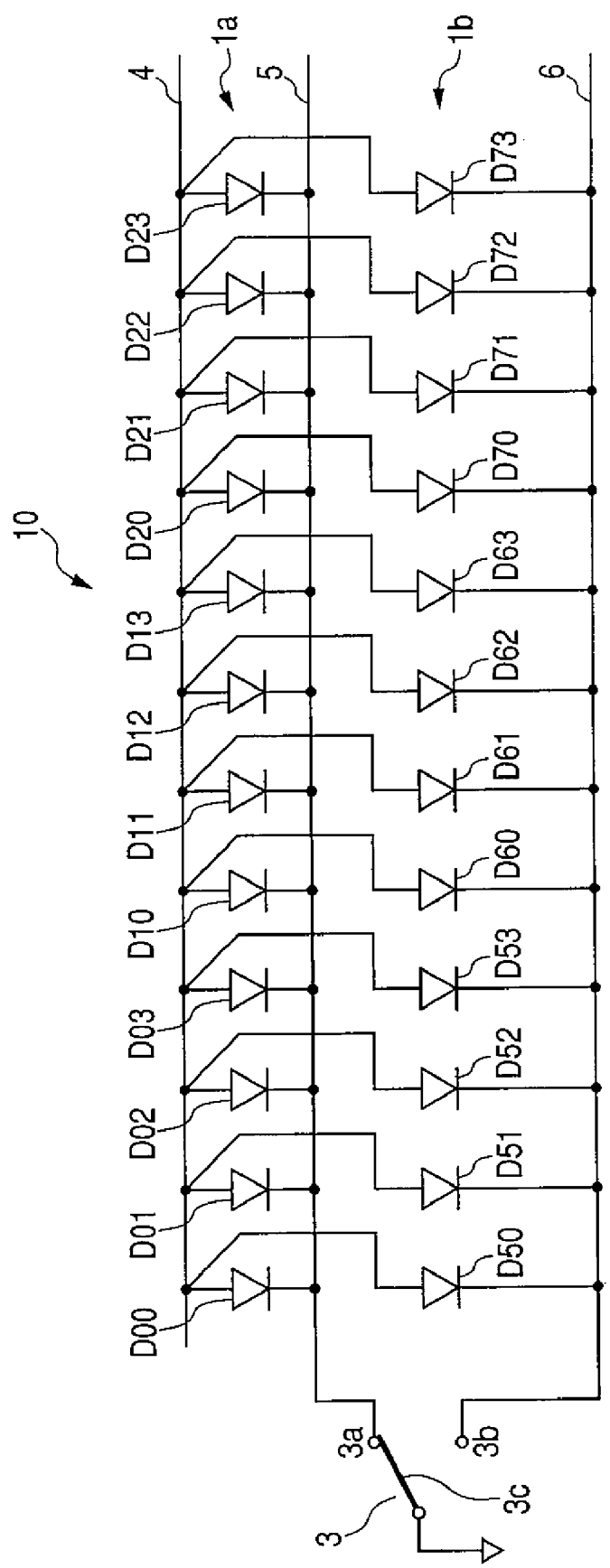
FIG. 3 is a circuit diagram of the line head of FIG. 1.

FIG. 3 shows a circuit for switching the element array to be activated. The line head 10 is provided with element arrays 1a and 1b. In the element array 1a are arrayed light emission elements D00 through D23 each comprising, for example, an EL element. Also, in the element array 1b are arrayed light emission elements D50 through D73 each comprising an EL element.

A positive power supply line 4 is commonly connected to anodes of the respective light emission elements in the element arrays 1a and 1b. A negative power supply line 5 is connected to cathodes of the respective light emission elements in the element array 1a, and a negative power supply line 6 is connected to cathodes of the respective light emission elements in the element array 1b. In other words, the element array 1a is connected between the power supply lines 4 end 5, so that a DC voltage is applied. Also, it is configured in such a manner that the element array 1b is connected between the power supply lines 4 and 6, so that a DC voltage is applied. It should be noted that in the actual line head 10, control circuits to activate individual light emission elements may be provided between the anodes of the respective light emission elements and the positive power supply line 4.

When a contact 3c of a switch 3 is placed on a contact point 3a, a DC voltage is applied between the power supply lines 4 and 5, which causes the respective light emission elements D00 through D23 in the element array 1a to activate. When the contact 3c of the switch 3 is placed on a contact point 3b, a DC voltage is applied between the power supply lines 4 and 6, which causes the respective light emission elements D50 through D73 in the element array 1b to activated.

The element array 1a is provided for a normal operation, and the element array 1b is provided for a backup operation. In the event that luminance of the element array 1a decreases, a voltage is applied to the respective light emission elements D50 through D73 in the element array 1b by the switch 3 so that they are activated. That is, in this embodiment, the element arrays are switched by the switch 3, by switching the power supply lines 5 and 6, to which are commonly connected the cathodes of the light emission elements in the respective element arrays. In this instance, the positive power supply line 4 is commonly connected to the anodes of the light emission elements in the respective element arrays. In other words, because only the power supply lines connected to one polarity of the light emission elements are switched, the configuration of the switching circuit can be simpler than in a case where the power supply lines of the both polarities are switched.

The switch 3 is embodied by a mechanical switch as described the above, however, it may be embodied by an electronic switch such as a transistor. Either one of the element array 1a and the element array 1b is used for the normal operation and the other for the backup operation, and it is therefore possible to use the element array 1b for the normal operation and the element array 1a for the backup operation.

Figure 4:
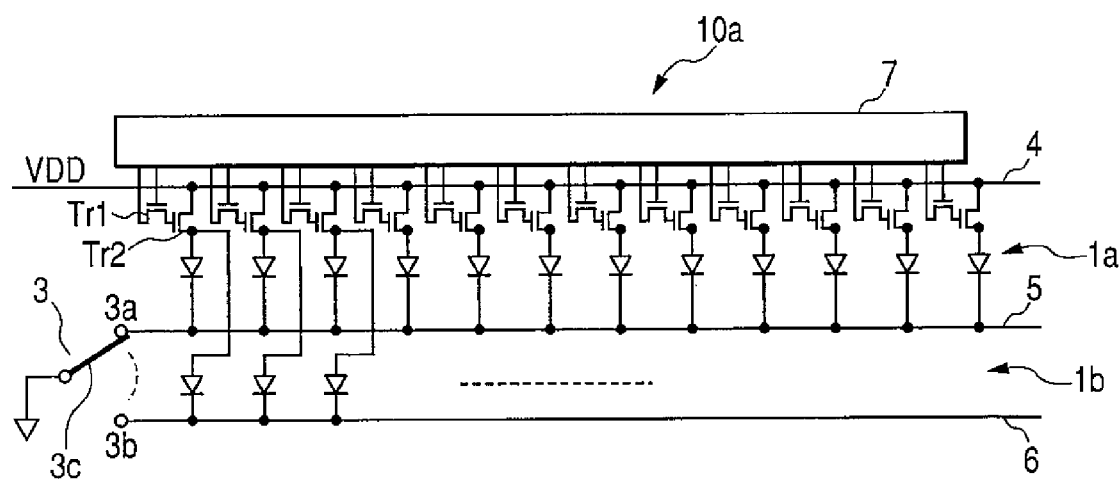
FIG. 4 is a circuit diagram of a line head according to a second embodiment of the invention.

FIG. 4 shows a second embodiment of the invention. The same components are designated by the same reference numerals and repetitive explanations will be omitted.

In a line head 10a, a drive transistor Tr2 is connected to the anode of each light emission element, and the source of a control transistor Tr1 is connected to the gate of the drive transistor Tr2. The drive transistor Tr2 and the control transistor Tr1 are, for example, FFTs (Fieid Effect Transistors).

In a case where the contact 3c of the switch 3 is placed on the contact point 3a so that a voltage is thereby applied between the power supply lines 4 and 5, when the control transistors Tr1 are activated by a control signal sent from a control circuit 7, the drive transistors Tr2 become conductive, which causes the respective light emission elements D00 through D23 in the element array 1a to emit light. When the contact 3c of the switch 3 is placed on the contact point 3b, switching is made for the respective light emission elements in the element array 1b to be activated. That is, as in the first embodiment, this embodiment also switches the element arrays by controlling the anodes of the light emission elements.

Since the control transistors Tr1 are connected in series to the drive transistors Tr2 connected to the respective light emission elements, it is possible to select individual light emission elements in the respective element arrays 1a and 1b for emitting light. Therefore, it is possible to meet various needs for image formation.

Figure 5:
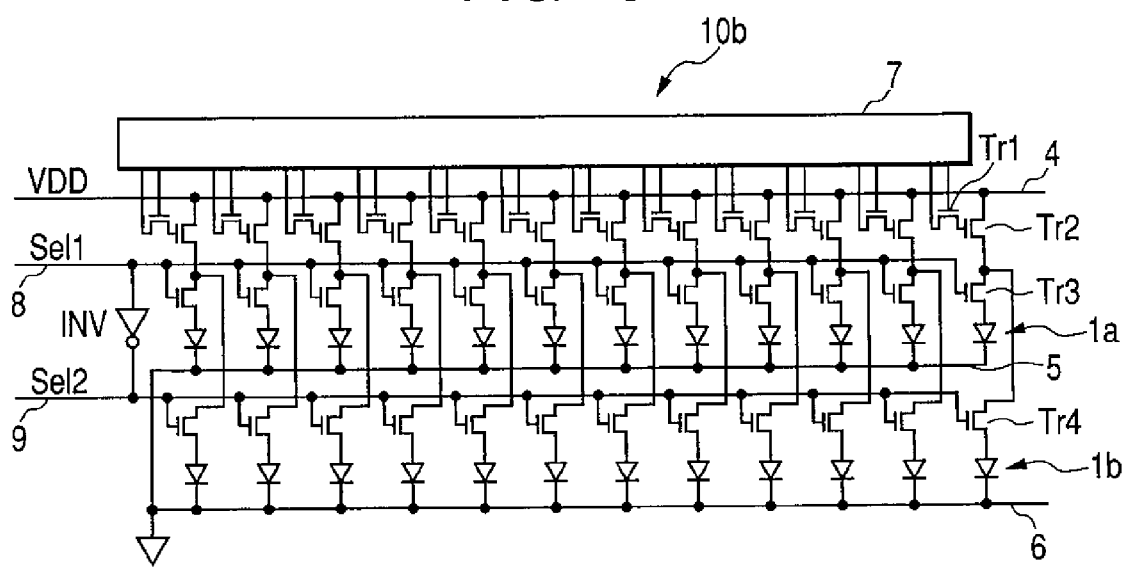
FIG. 5 is a circuit diagram of a line head according to a third embodiment of the invention.

FIG. 5 shows a third embodiment of the invention. The earned components are designated by the same reference numerals and repetitive explanations will ha omitted.

In a line head 10b, switching transistors Tr3 and Tr4 for switching element arrays are connected in series to the drive transistors Tr2 common to the element arrays 1a and 1b. Signal lines 8 and 9 through which selection signals Se11 and Se12 for the element arrays are fed. An inverter INV outputs a selection signal Se12, which is an inverted selection signal Se11, to be fed to the signal line 9. Herein, the selection signal Se12, which is an inverted selection signal Se11, may be externally fed to omit the inverter INV.

The positive power supply line 4 is commonly connected to the anodes of the respective light emission elements in the element arrays 1a and 1b. Also, the negative power supply line 5 is connected to the cathodes of the respective light emission elements in the element array 1a, and the negative power supply line 6 is connected to the cathodes of the respective light emission elements in the element array 1b. The negative power supply lines 5 and 6 are maintained in a connected state at a common potential.

When the control transistors Tr1 are activated by a control signal from the control circuit 7, the drive transistors Tr2 become conductive. When the selection signal Se11 is fed to the gates of the transistors Tr3 for switching the element arrays from the signal line 8 in this state, the respective light emission elements in the element array 1a are activated. In this instance, because no selection signal Se12 is fed from the signal line 9, the light emission elements in the element array 1b are kept deactivated.

When the selection signal Se11 from the signal line 8 is turned off and the selection signal Se12 from the signal line 9 is turned on, the switching transistors Tr3 are shut and transistors Tr4 become conductive. The light emission elements in the element array 1a are thereby deactivated, and instead the light emission elements in the element array 1b are activated. In other words, the transistors Tr3 and Tr4 are activated by the selection signals Se11 and Se12 from the signal lines 8 and 9, respectively, to control the switching of the respective element arrays 1a and 1b at the cathodes.

Since the switching of the element arrays is performed by the transistors Tr3 and Tr4, it is possible to achieve a rapid and reliable switching operation in comparison with a mechanical switch. In addition, since the element arrays are switched by the signals from the signal lines without switching the polarities of the power supply lines, it is possible to prevent the occurrence of an instantaneous voltage change associated with the switching, which can in turn prevent damages to the light emission elements.

In a case where the light emission elements comprise organic EL elements and the switching transistors Tr3 and Tr4 comprise TFTs (Thin Film Transistors). It is possible to assemble the line head 10b using the same fabrication technique for both the switching transistors and the light emission elements. The manufacturing costs, therefore, can be saved. Also in this embodiment, it is possible to activate or deactivate the individual light emission elements in the respective element array, by controlling the operation timings of the control transistors Tr1 with the use of the control signal from the control circuit 7.

Figure 6:
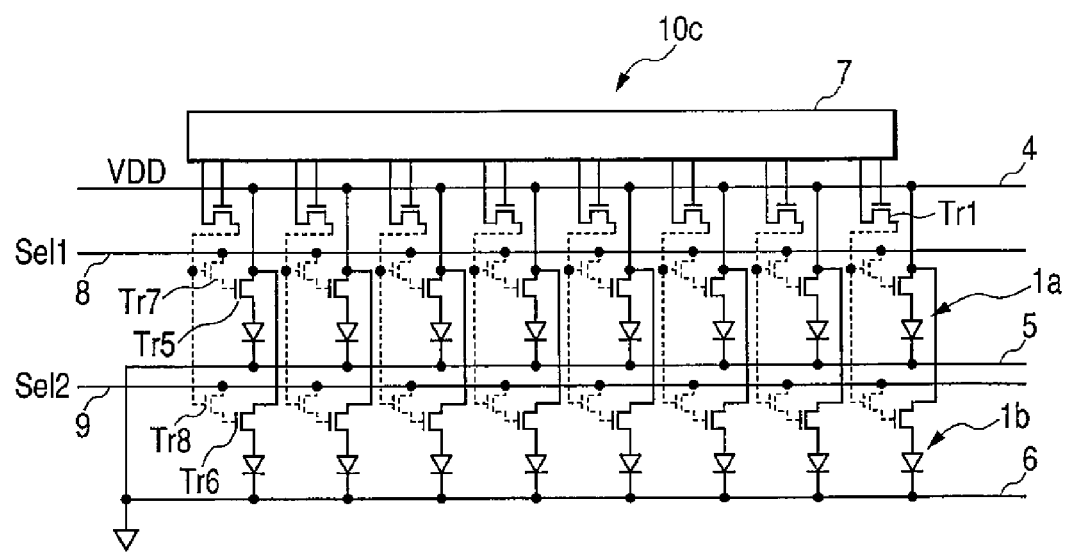
FIG. 6 is a circuit diagram of a line head according to a fourth embodiment of the invention.

FIG. 6 shows a fourth embodiment of the invention. The same components are designated by the same reference numerals and repetitive explanations will be omitted.

In a line head 10c, a driver transistor Tr5 is provided for each light emission element in the element array 1a, a driver transistor Tr6 is provided for each light emission element in the element array 1b, and transistors Tr7 and Tr8 for switching the element arrays are connected in series to the control transistors Tr1 common to the element arrays 1a and 1b.

In this embodiment, while the control transistors Tr1 remain conductive by a signal from the control circuit 7, either of the selection signals Se11 and Se12 from the signal lines 8 and 9, respectively, is fed to the transistor Tr7 or Tr8 for switching the element arrays. In this instance, the driver transistors Tr7 or Tr8 connected to the transistor Tr7 or Tr8 are activated, which causes the respective light emission elements in the element array 1a or the light emission element 2 to be activated.

Figure 7:
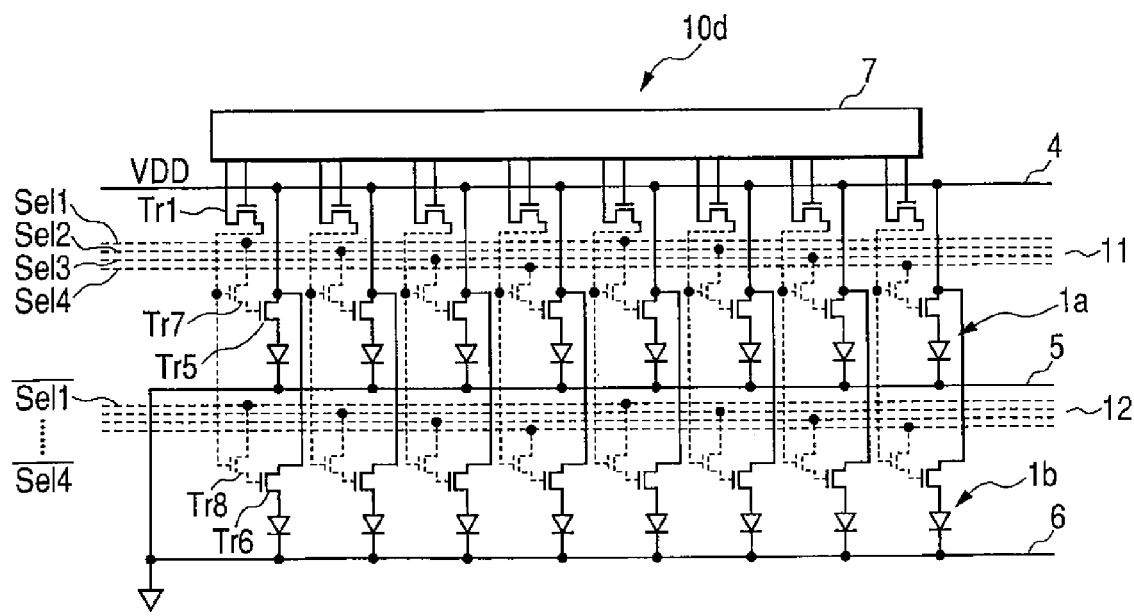
FIG. 7 is a circuit diagram of a line head according to a fifth embodiment of the invention.

FIG. 7 shows a fifth embodiment of the invention. The same components are designated by the same reference numerals and repetitive explanations will be omitted.

In a line head 10d, transistors Tr7 and Tr8 for switching the element arrays are connected in series to the control transistors Tr1 common to the element arrays 1a and 1b. Also, transistors Tr7 and Tr8 am connected in series to the drive transistors Tr5 and Tr6 for the light emission elements in the respective element arrays.

To the signal line 11 are fed selection signals Se11 through Se14 to select the respective light emission elements in the element array 1a. To the signal line 12 are fed inverted signals of the selection signals Se11 through Se14 to select the respective light emission elements in the element array 1b. When the selection signals Se11 through Se14 are turned on, the inverted signals are turned off, and vice versa.

Any of the selection signals Se11 through Se14 is fed to the drains of the switching transistors Tr7 corresponding to the respective light emission elements in the element array 1a. Also, any of the inverted signals of the selection signals Se11 through Se14 is fed to the drains of the switching transistors Tr6 corresponding to the respective light emission elements in the element array 1b.

While the control transistors Tr1 are activated by a control signal from the control circuit 7, the switching transistors Tr7 and the drive transistors Tr5 become conductive when the selection signals Se11 through Se14 from the signal line 11 are turned on. The respective light emission elements in the element array 1a are thereby activated. In this instance, because the inverted signals or the selection signals Se11 through Se14 in the signal line 12 are turned off, the respective light emission elements in the element array are kept deactivated.

When the inverted signals of the selection signals Se11 through Se14 in the signal line 12 are turned on, the respective light emission elements in the element array 1b are activated, and instead the respective light emission elements in the element array 1a are deactivated. Also in this embodiment, by controlling the operation timings of the control transistors Tr1 with the use of the control signal from the control circuit 7, it is possible to select individual light emission elements in the element arrays 1a and 1b for emitting light.

Figure 8:
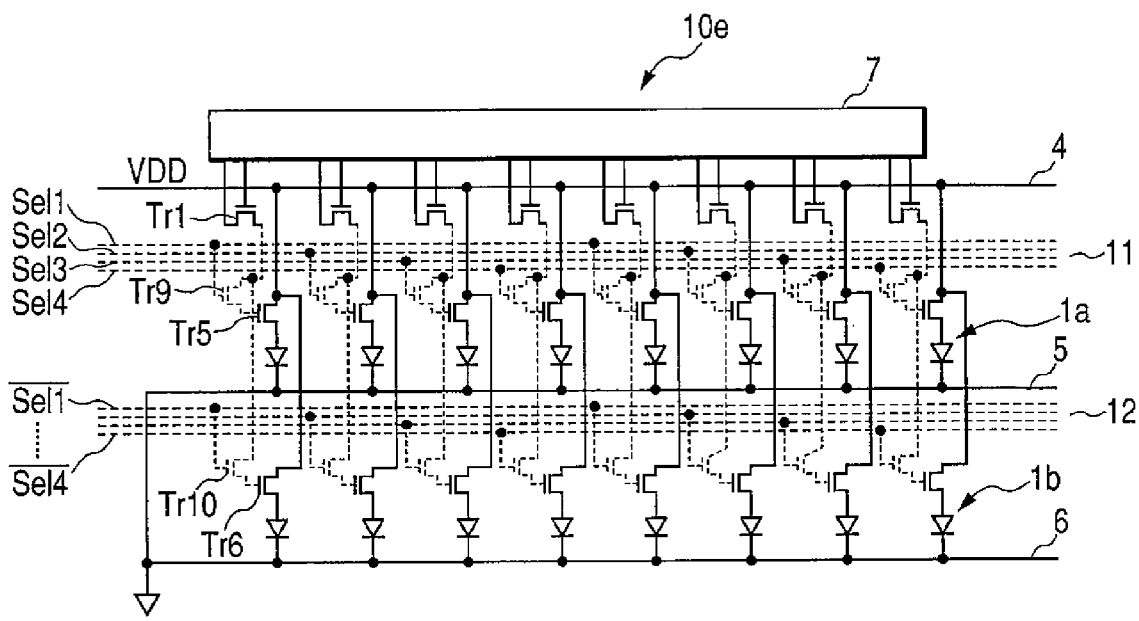
FIG. 8 is a circuit diagram of a line head according to a sixth embodiment of the invention.

FIG. 8 shows a sixth embodiment of the invention. The same components are designated by the same reference numerals and repetitive explanations will be omitted.

In a line head 10e, transistors Tr9 and Tr10 are for switching the element arrays. With the switching transistors Tr9, the gates are connected to the signal line 11 and the drains are connected to the sources or the control transistors Tr1. With the switching transistors Tr10, the gates are connected to the signal line 12 and the drains are connected to the sources of the control transistors Tr1. The transistors Tr9 and Tr10 comprise FETs of the same channel (N channel in this embodiment).

The transistors Tr9 and Tr10 are connected in series to the control transistors Tr1. While the control transistors Tr1 remain conductive by a control signal from the control circuit 7, the respective light emission elements in the element array 1a or the element array 1b are activated by enabling either the signal line 11 or 12.

In this embodiment, it is possible to select individual light emission elements in the element arrays 1a and 1b for emitting light, by controlling the operation timings of the control transistors Tr1 by the control circuit 7. This embodiment is different from the fifth embodiment in that the output signals of the control transistors Tr1 are fed to the drains of the transistors Tr9 and Tr10, and that selection signals are fed to the gates of the switching transistors Tr9 and Tr10. In short, these embodiments are different in the way by which the control transistors Tr1 are connected to the transistors Tr9 and Tr10.

Figure 9:
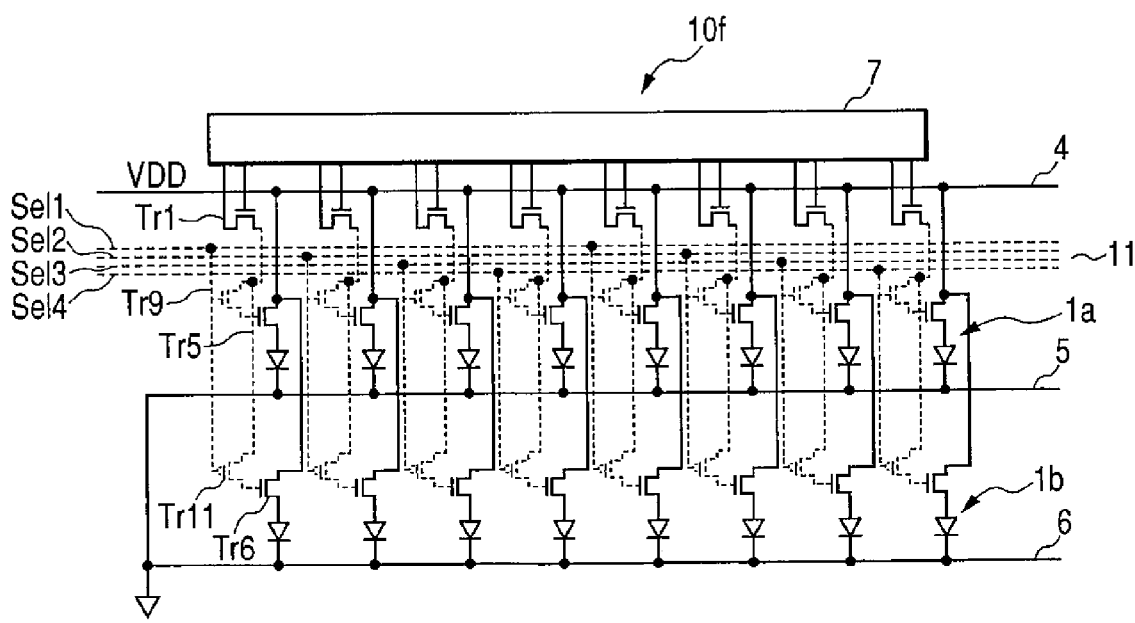
FIG. 9 is a circuit diagram of a line head according to a seventh embodiment of the invention.

FIG. 9 shows a seventh embodiment of the invention. The same components are designated by the same reference numerals and repetitive explanations will be omitted.

In a line head 10f, the transistors Tr9 and Tr11 for switching the element arrays comprise FETs of different channels. In this embodiment, the transistors Tr9 comprise N-channel FETs and the transistors Tr11 comprise P-channel FETs.

To the gates of a pair of the transistors Tr9 and Tr11 are fed signals Se11 through Se14 from the same data line 11. Hence, when one transistor Tr9 is turned on, the other transistor Tr11 is turned off, and vice versa. In other words, when the signals Se11 through Se14 are turned on, all the light emission elements in the element array 1a are activated and all the light emission elements in the element array 1b are kept deactivated. When the signals Se11 through Se14 are turned off, all the light emission elements in the element array 1a are kept deactivated and all the light emission elements in the element array 1b are activated. Therefore, the data line to feed the inverted signals of the signals Se11 through Se14 can be omitted.

Figure 11:
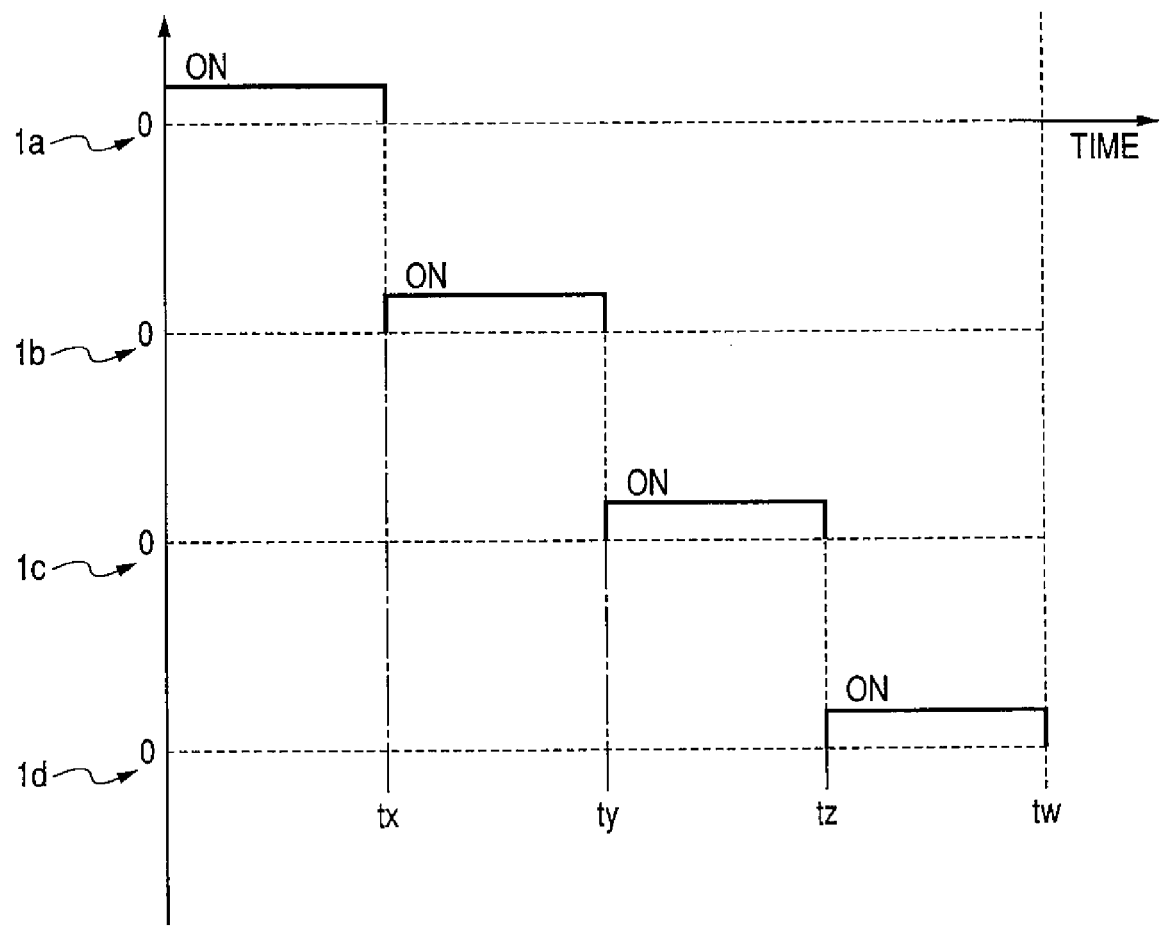
FIG. 11 is a diagram for explaining an operation of the line head of FIG. 10.

FIG. 11 shows an eighth embodiment of the invention. The same components are designated by the same reference numerals and repetitive explanations will be omitted.

In this embodiment, one of the four element arrays 1a through 1d shown in FIG. 10 is subsequently activated. Specifically, all the light emission elements in the element array 1a are activated from the time points 0 to tx. All the light emission elements in the element arrays 1b through 1d are kept deactivated. At the time point tx, the element array 1a is deactivated, and switching is made for the element array 1b to be activated. Thereafter, at the time point ty, the element array 1b is deactivated and switching is made for the element array 1c to be activated.

At the time point t2, the element array 1c is deactivated and switching is made for the light emission element 1d to be activated. At the time point tw, the element array 1d is deactivated. In a case where predetermined luminance has been restored in the element array 1a due to a drop in temperature of the respective light emission elements, it is possible to activate the element array 1a again at the time point tw. Also, it is possible to activate the respective element arrays 1b through 1d again after a predetermined time period since they are respectively deactivated.

Accordingly, it is possible to prevent the decrease in luminance caused when a single element array is Kept activated over a long time period, thereby prolonging the lifetime of the line head.

In this embodiment, an allowable continuous driving time period is stored in advance in the memory 25 shown in FIG. 2.

The host controller 23 judges whether the activated time period of one element array exceeds the allowable time period stored in the memory 25. Upon judging that the activated time period of the one element array has exceeded the allowable time period, the host controller 23 sends a signal to the switching circuit 21 to activate another element array formed in the line head 10.

The counter 24 counts the time period that one element array is activated for the above judgment Since the luminance decrease of the light emission element can be judged on the basis of the number of printed dots or print media, the counter 24 and the memory 25 can be configured so as to set various parameters, such as the number of print dots or print media, to be used for the above judgment.

Specifically, in a case where the number of print dots is given as a parameter, the allowable number of the print dots is registered in the memory 25. The counter 24 is formed as a dot counter, so that when the count number in the dot counter exceeds the allowable number registered in the memory 25, the host controller 23 outputs a switching signal of the element arrays to the switching circuit 21.

When the number of print media is given as a switching parameter for the element arrays, a switching signal is outputted, for example, each time a sheet of print medium has been printed. Alternatively, when a vertical sync signal (Vsync) is given as a switching parameter for the element arrays, the number of pulses is counted. It should be noted that in the case of color print, the counter 24 and the memory 25 ere provided for each color.

Figure 12:
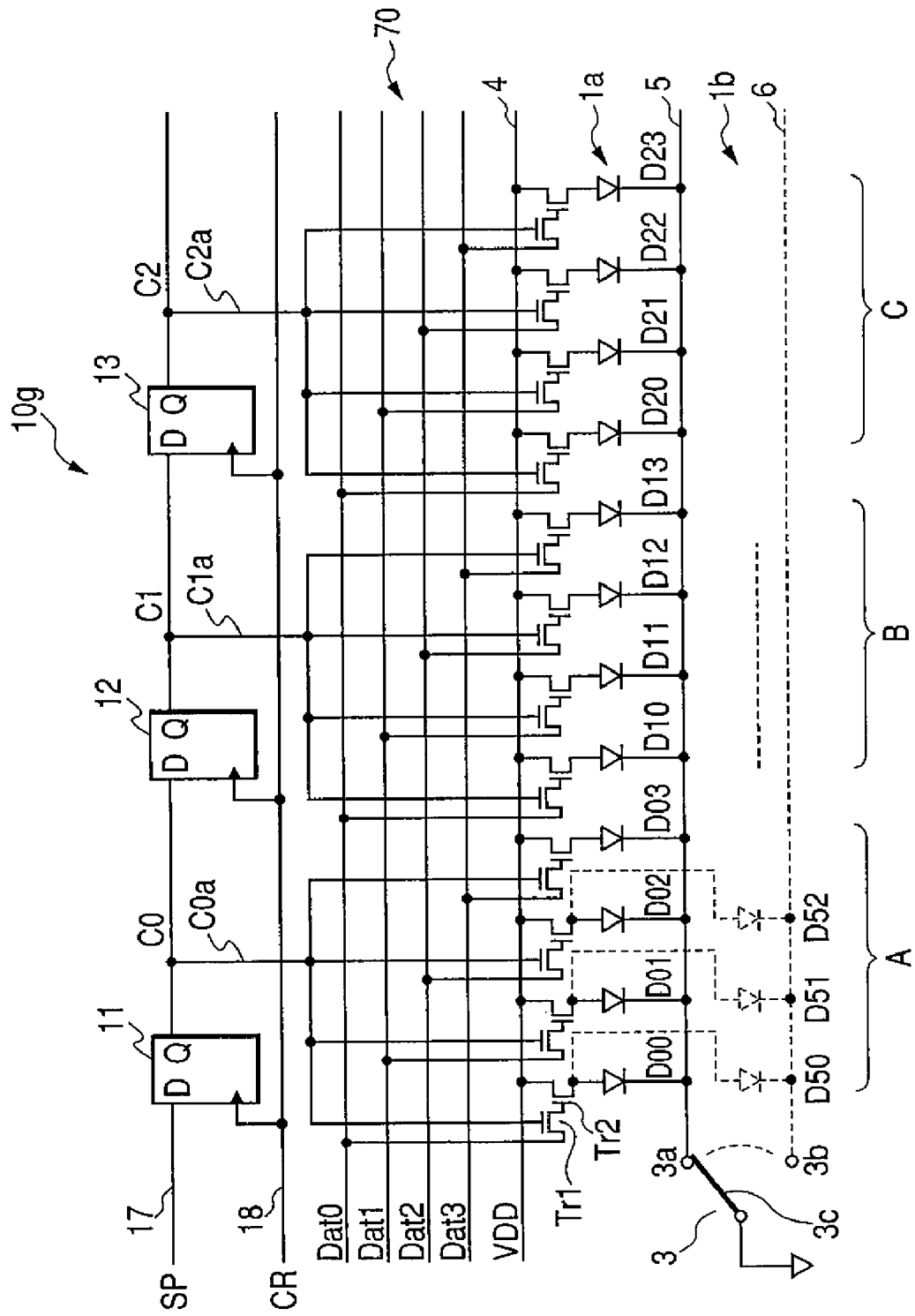
FIG. 12 is a circuit diagram of a line head according to a ninth embodiment of the invention.

FIG. 12 shows a ninth embodiment of the invention. The same components are designated by the same reference numerals and repetitive explanations will be omitted.

The element array 1a is provided for the normal operation and the element array 1b is provided for the backup operation. In the event of a failure in any of the light emission elements D00 through D23 in the element array 1a, a voltage is applied to the respective light emission elements D50 through D73 in the element array 1b by the switch 3 for light emitting operations to be performed.

Shift registers 11, 12, 13 controls the light emission elements D00 through D23 block by block. An output signal C0 of the shift register 11 controls a block A including the light emission elements D00 through D03. An output signal C1 of the shift register 12 controls a block B including the light emission elements D10 through D13. An output signal C2 of the shift register 13 controls a block C including the light emission elements D20 through D23.

A start pulse SP is inputted to a data terminal D of the shift register 11 from a signal line 17. A clock signal CK is inputted to each of the shift registers 11 through 13 from a signal line 18. Data signals Dat0 through Dat3 are fed from a signal line 70 to the respective light emission elements.

The output signal C0, outputted from an output terminal Q of the shift register 11, is applied via a signal line C0a to the gates of the respective control transistors Tr1 connected to the light emission elements D00 through D03. The output signal C1, outputted from an output terminal Q of the shift register 12, is applied via a signal line C1a to the gates of the respective control transistors Tr1 connected to the light emission elements D10 through D13. The output signal C2, outputted from an output terminal Q of the shift register 13, is applied via a signal line C2a to the gates of the respective control transistors Tr1 connected to the light emission elements D20 through D23.

In short, when the output signals C0 through C2 are at the high level (hereinafter, referred to as the H level), signals are applied to the gates of the respective control transistors Tr1 that control the light emission elements in the corresponding blocks. All the light emission elements are connected in parallel between the power supply line 4 to which a positive voltage VDD is applied and the negative power supply line 5. Since the light emission elements in each element array are divided into blocks to be activated or deactivated, an area at an exposure operation is executed can be controlled as required.

The data signals Dat0 through Dat3 are fed to the drains of the respective control transistors Tr1. Hence, when the data signals Dat0 through Dat3 are fed to the control transistors Tr1 for the light emission elements selected by the block selection signals, the drive transistors Tr2 connected to these control transistors Tr1 become conductive, which causes the corresponding light emission elements to be activated. For example, in the case of the block A, the data signals Dat0 through Dat3 are fed to the control transistors Tr1 that respectively control the light emission elements D00 through D03. In other words, the data signals Dat0 through Dat3 serve as selection signals to select individual light emission elements within one block. That is, it is possible to select at least one individual light emission element to be activated.

Concrete operations of the respective light emission elements will now be described with reference to the timing chart of FIG. 13. Assume that a DC voltage is applied between the positive and negative power supply lines 4 and 5 connected to the respective light emission elements of FIG. 12. In this timing chart, an operation time of the light emission elements is divided into 8 segments of time period. The length of each segment is set, for example, to 10 μs. When the start pulse SP is inputted to the data terminal D of the shift register 11, the start pulse SP is captured in synchronous with the rising of the clock signal CK, and transferred sequentially from the shift registers 11 to 13.

Herein, intervals of the signal SP are set in such a manner that an output of any one of the shift registers 11 to 13 alone is at the H level. For example, in the segment 1, the start pulse SP is inputted to the shift register 11 at the time point 0, at which the output signal C0 of the shift register 11 shifts to the H level because the clock signal CK is at the H level at the timing "u". The start pulse SP is then transferred to the shift register 12 at the timing "v" at which the next clock signal CK shifts to the H level, and the output signal C1 thereby shifts to the H level. Further, the start pulse SP is transferred to the shift register 13 at the timing "w" at which the next clock signal CK shifts to the H level, and the output signal C2 thereby shirts to the H level.

Outputs from the respective shift registers are connected to the control transistors Tr1 in each block. As is shown in FIG. 13, the signals C0 through C2 to select the respective blocks are applied to the control transistors Tr1 with a time difference. Hence, when the switches of the control transistors Tr1 in a given block are turned on, the switches of groups of the control transistors Tr1 in the other blocks are kept off.

In the selected block, the control transistors Tr1 are turned on so as to establish a condition that the data signals Dat0 through Dat3 can be fed to the gates of the drive transistors Tr2. The potentials of the gates of the drive transistors Tr2 are thus determined according to the states (H level or L level) of the data signals Dat0 through Dat3, and in turn the on/off states of the drive transistors Tr2 in the selective block are determined.

When a given block that is selected will no longer be selected, the data signals Dat0 through Dat3 will not be fed to the gates of the drive transistors Tr2 in the block that has boon selected. However, because the potentials of the gates of the drive transistors Tr2 are held at the potentials when the block was selected due to a parasitic capacitance, the on/off states of the drive transistors Tr2 are maintained. This state of the drive transistors Tr2 is maintained until the block is selected again.

When the block in the deselected state is selected at the next timing, the on/off states of the drive transistors Tr2 in the block are determined according to the states of the data signals Dat0 through Dat3. The operations described as above are repeated sequentially for all the blocks. Hence, the activation time period can be controlled on the basis of this repetitive cycle.

Figure 13:
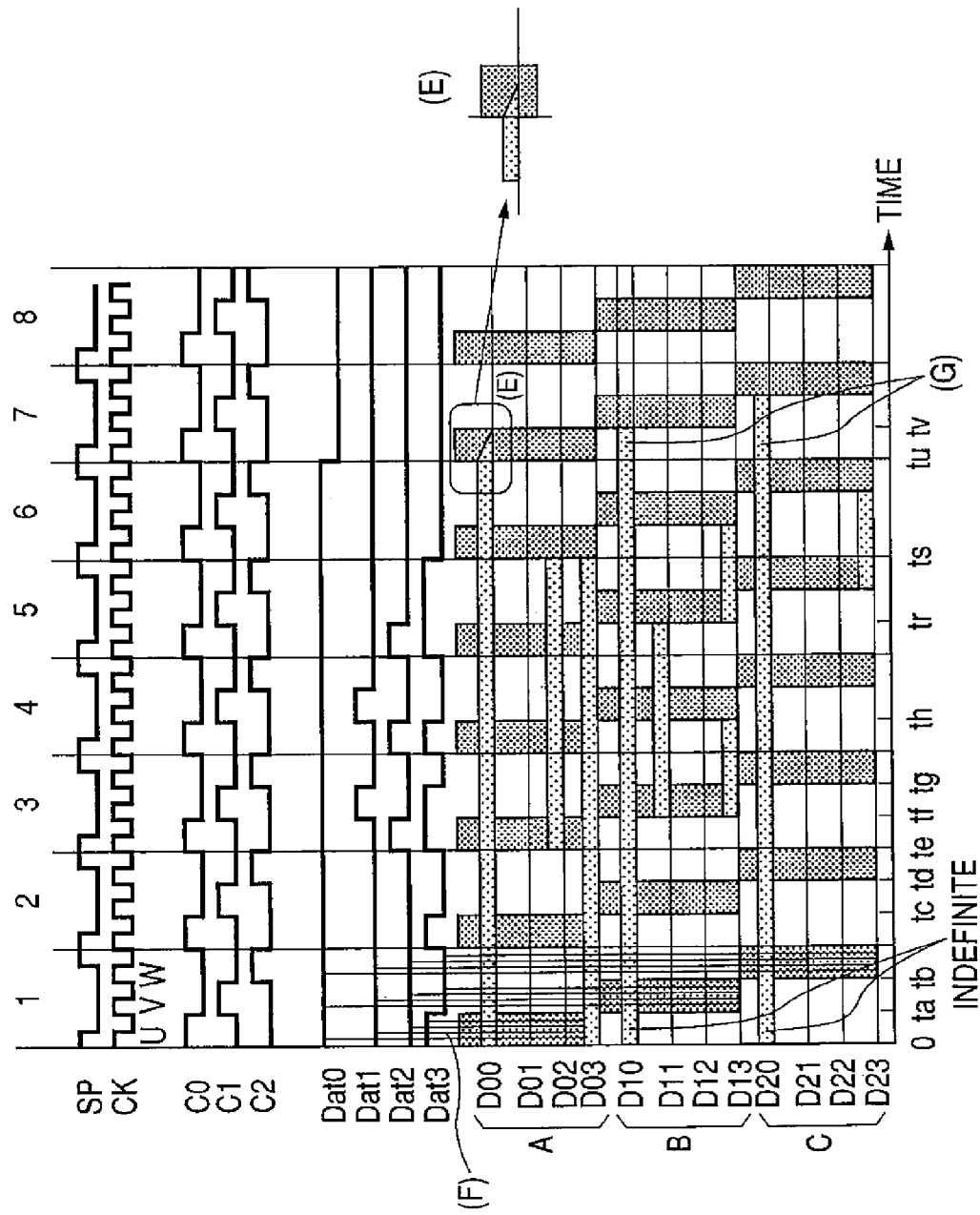
FIG. 13 is a time chart for explaining an operation of the line head of FIG. 12.

Referring to FIG. 13, the block A is selected at the time point 0 in the segment 1. The block D is selected next at the time point ta, and the block C at the time point tc. For the segments 2 through 8, any of the corresponding blocks A through C is selected in the same manner as above when the output signals C0 through C2 of the shift registers 11 through 13, respectively, are at the H level. Each of the vertically extending hatched areas indicates that the corresponding block is selected. Each of the horizontally extending hatched areas indicates that the corresponding light emission element is activated.

The data signals Dat0 through Dat3 select individual light emission elements within the respective blocks A through C as described above. For example, within the block A, the correspondence between the data signals and the light emission elements is as follows: Dat0(D00). Dat1(D01), Dat2(D02), and Dat3(D03). Fine lines (F) indicate the correspondence between the data signals and the light emission elements in the respective blocks as described above.

For the block A, in the segment 1, when the block selection signal C0 is at the H level at the time point 0, the data signals Dat0 and Dat3 shift to the H level, and the light emission elements D00 and D03 are activated. When the block selection signal C0 shifts to the low level (hereinafter, referred to as the L level) at the time point ta, the voltage is maintained due to a parasitic capacitance between the gate and the source in each corresponding control transistor Tr1. The light emission elements D00 and D03 thus remain activated.

The block selection signal C0 and the data signal Dat3 shift to the L level at the time point tc, at which the block selection signal C1 shifts to the H level and the block B is thereby selected. However, because the drive transistor Tr2 remain conductive due to the parasitic capacitance between the gate and the source in the control transistor Tr1, the light emission element D03 remains activated.

The block selection signal C0 shifts to the H level at the time point ts, and the on/off state of the drive transistor Tr2 connected to the light emission element D03 is determined according to the state of the data signal Dat3. At the time point ts, the control transistor Tr1 is turned off because the data signal Dat3 is at the L level, and the drive transistor Tr2 is also turned off. The light emission element D03 is thereby deactivated.

The block selection signal C0 and the data signal Dat2 shift to the H level at the time point te, and the light emission element D02 is thereby activated. The data signal Dat2 shifts to the L level at the time point tr; however, the activated state is maintained until the time point ts, that is, the timing at which the block selection signal C0 shifts to the H level again. The light omission element D03 is deactivated at the time point ts as described above.

The date signal Dat0 shifts to the L level at the time point tu, and the light emission element D00 is thereby deactivated. As is shown in an enlarged view of the portion (E), the switching of the on/off states of the light emission element D00 takes place in the selection period of the block selection signal C0. The switching of the on/off states of the other light emission elements also takes place in the selection periods of the block selection signals (although not explicitly shown in the drawing).

Now, by referring to the operation for the block B, because the data signal Dat0 is at the H level when the block selection signal C1 is at the H level at the time point ta in the segment 1, the light emission element D10 is activated. Although the light emission element D10 is in an indefinite state from the time points 0 to ta, it is placed in the activated state at the time point ta as described above.

In the segment 3, the block selection signal C1 shifts to the H level and the data signal Dat1 shifts to the H level at the time point tf, and the light emission element D11 is thereby activated. Also, because the data signal Dat3 is at the H level at the time point tf, the light emission element D13 is also activated. Because the block selection signal C1 shifts to the H level at the time point th, the light emission element D13 is activated or deactivated according to the state of the data signal Dat3. Because the data signal Dat3 is at the L level in this instance, the light emission element D13 is deactivated.

At the time point tr, because the block selection signal C1 shifts to the H level and the data signal Dat1 shifts to the L level, the light emission element D11 is deactivated. Because the data signal Dat3 is at the H level at the time point tr, the light emission element D13 is activated. The block selection signal C1 shifts to the L level and the data signal Dat0 also shifts to the L level at the time point tu. However, as has been described, the drive transistor Tr2 remains conductive, and the light emission element D10 thus remains activated until the time point tv as is indicated by G in the drawing. Descriptions for the operations of the respective light emission elements in the block C are omitted.

Figure 14:
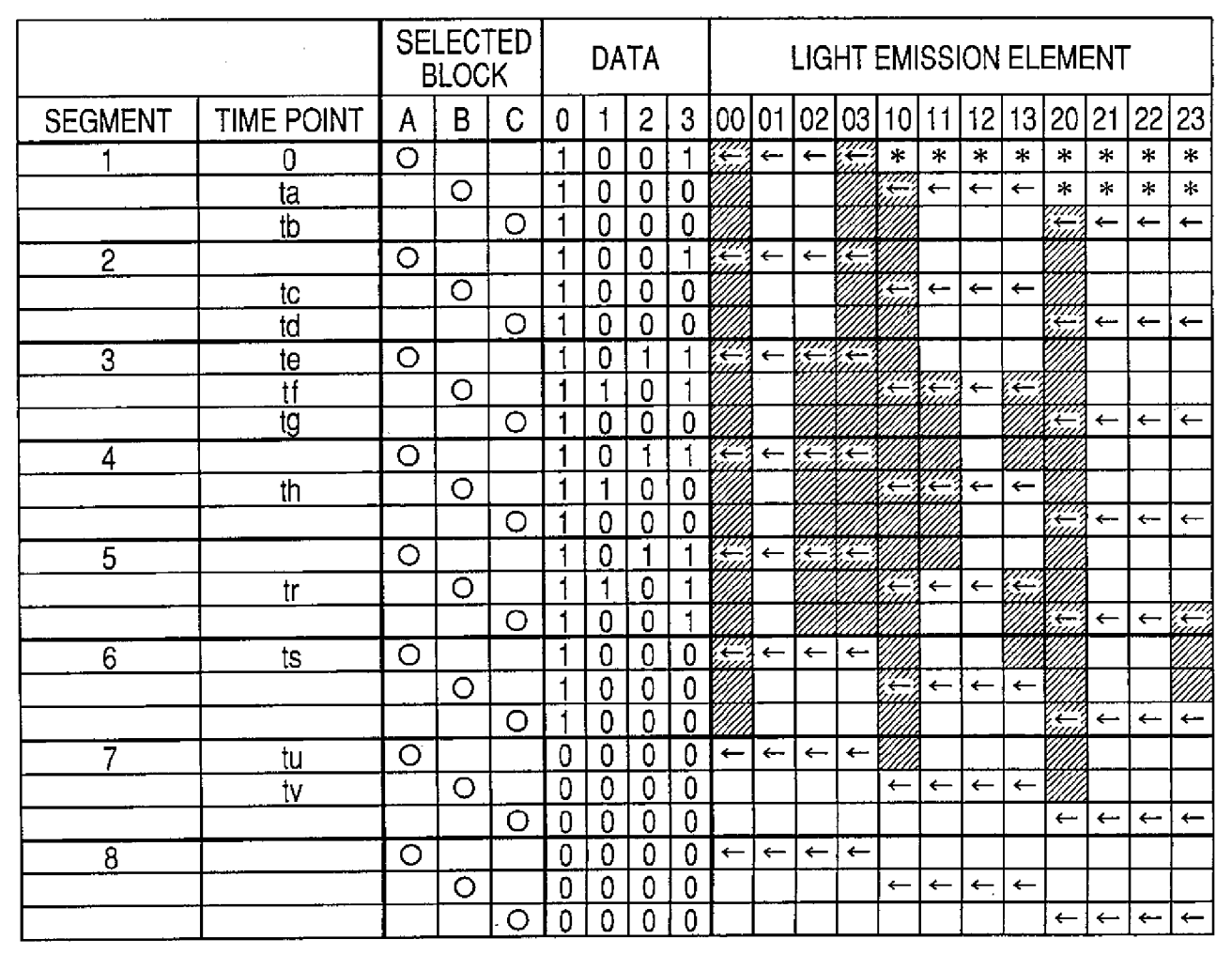

FIG. 14 is an explanatory view, showing the timing chart of FIG. 3 in the form of a table. In this table, a circle indicates that the corresponding block is selected. In the "data" section, "1" indicates the H level, and "0" indicates the L level of the data signal Dat 0 through Dat 3.

In the "light emission element" section, each of the vertically extending hatched areas indicates that the corresponding light emission element is activated (i.e., corresponding to the horizontal hatched areas in FIG. 13). An asterisk indicates an indefinite state of the light emission element. An arrow indicates that whether the light emission element is activated or deactivated is determined by the on/off state of the data signal. A blank cell indicates a state where the preceding state is maintained. In this manner, in this embodiment, each of the plural element arrays is divided into plural blocks, and individual light emission elements in the respective blocks are selected and controlled as long as necessary. In other words, because two selecting stages are provided for individual light emission elements in the element arrays, it is possible to address image formation processing of various modes. The applications of the line head, therefore, can be broadened.

In this embodiment, since the shift registers 11 through 13 can be formed on a single substrate together with the element arrays 1a and 1b, the control transistors Tr1, and the drive transistors Tr2. A compact line head can be thereby achieved.

Figure 15:
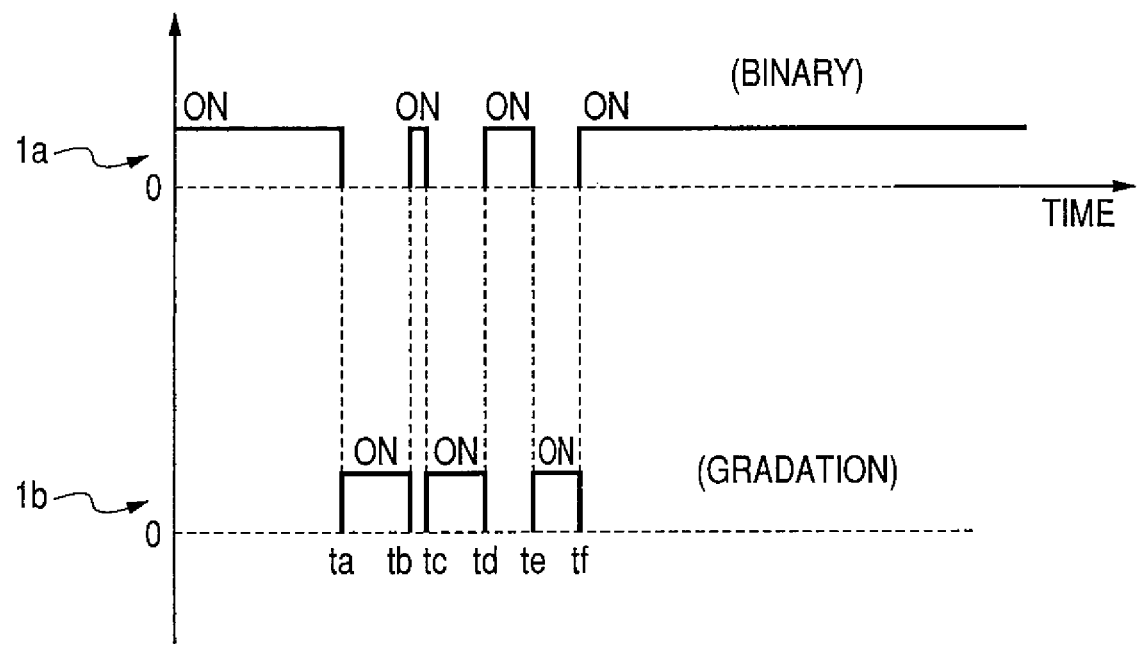
FIG. 15 is a diagram for explaining an operation of a line head according to a tenth embodiment of the invention.
Figure 16:
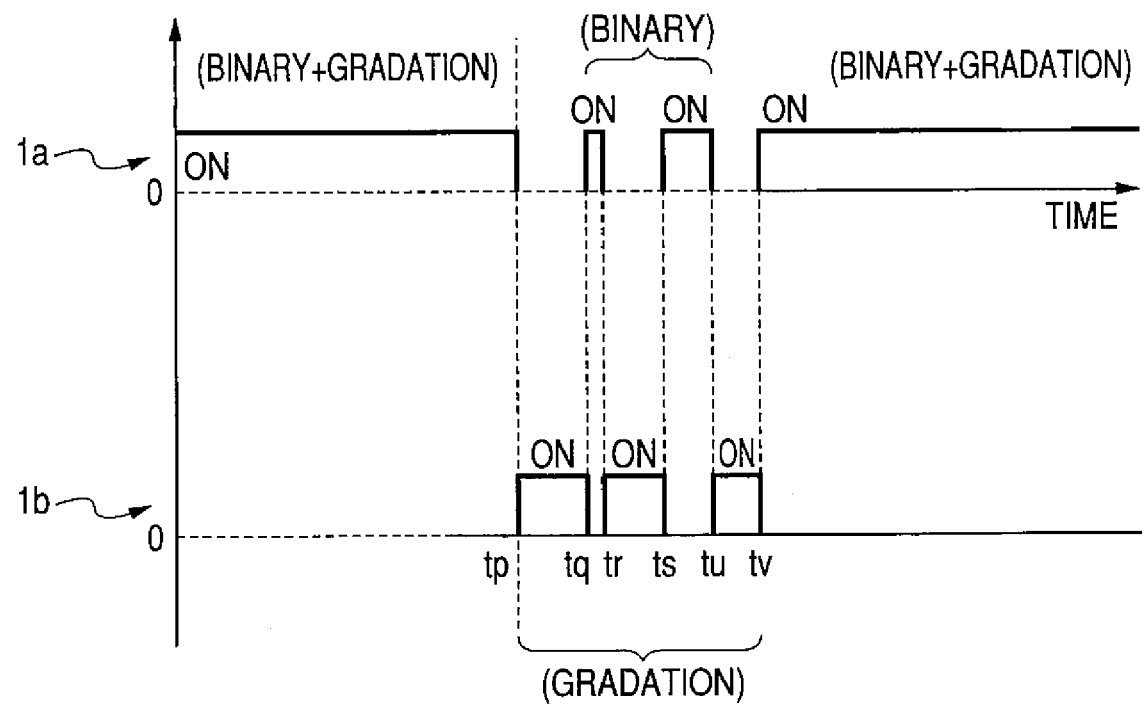
FIG. 16 is a diagram for explaining an operation of a line head according to an eleventh embodiment of the invention.

FIG. 15 shows a tenth embodiment of the invention. The same components are designated by the same reference numerals and repetitive explanations will be omitted.

In this embodiment, the element array 1a is used for forming a binary data image such as character information, and the element array 1b for forming a gradation data image such as photographic information. Specifically, all the light emission elements in the element array 1a are activated during the time period 0 to ta to form the binary data image. All the light emission elements in the element array 1b are kept deactivated.

When luminance decreases below the predetermined value due the continuous activation of the element array 1a, the element array 1a is deactivated at the time point ta. Incidentally, switching is made for the element array 1b to be activated, so that the gradation data image is formed. At the lime point tb, the element array 1b is deactivated while the element array 1a is activated to form the binary data image for a short time until the time point tc. Because the activation time period or the element array 1a is short and only the binary data image is formed, deterioration of the obtained image quality poses no practical problem.

Generally, the accuracy in image formation, when an image is formed with decreased luminance of the light emission elements, differs between a case where the binary data image is formed and a case where the gradation data image is formed. In the former case, even when luminance of the light emission elements decreases slightly, a degree of deterioration of the obtained image quality is smaller than in the latter case.

Thereafter, the gradation data image is formed by the element array 1b until the time point td, and the binary data image is formed by the element array 1a during the lime period td to te. Herein, because a certain time period has passed since the respective light emission elements in the element array 1a were deactivated at the time point ta, the temperature has dropped and luminance has been restored. Hence, the binary data image is formed during the time period td to te, which is longer than the time period tb to tc. From the time points te to tf, the gradation data image is formed by the element array 1b. Because the temperature of the light emission element in the element array 1a has sufficiently dropped at the time point tf and the luminance thereof has been sufficiently restored, the binary data image is formed continuously.

According to the configuration of this embodiment, it is possible to prevent deterioration of the print quality due to the decrease in luminance of the light emission elements in comparison with a case where both the binary data image and the gradation data image are formed continuously by a single element array. It is also possible to prolong the lifetime of the light emission elements and the line head.

The switching timings of the element arrays as shown in FIG. 15 are set by taking various factors into account. In other words, optimal timings are sat on the basis of a temperature characteristic of the light emission element materials, a heat-releasing characteristic of the panel of the line head to which the light emission elements are attached, etc. In this embodiment, two element arrays are switched according to image information including binary data and gradation data. However, it may be configured in such a manner that three or more element arrays are used by being switched at adequate timings.

Figure 18:
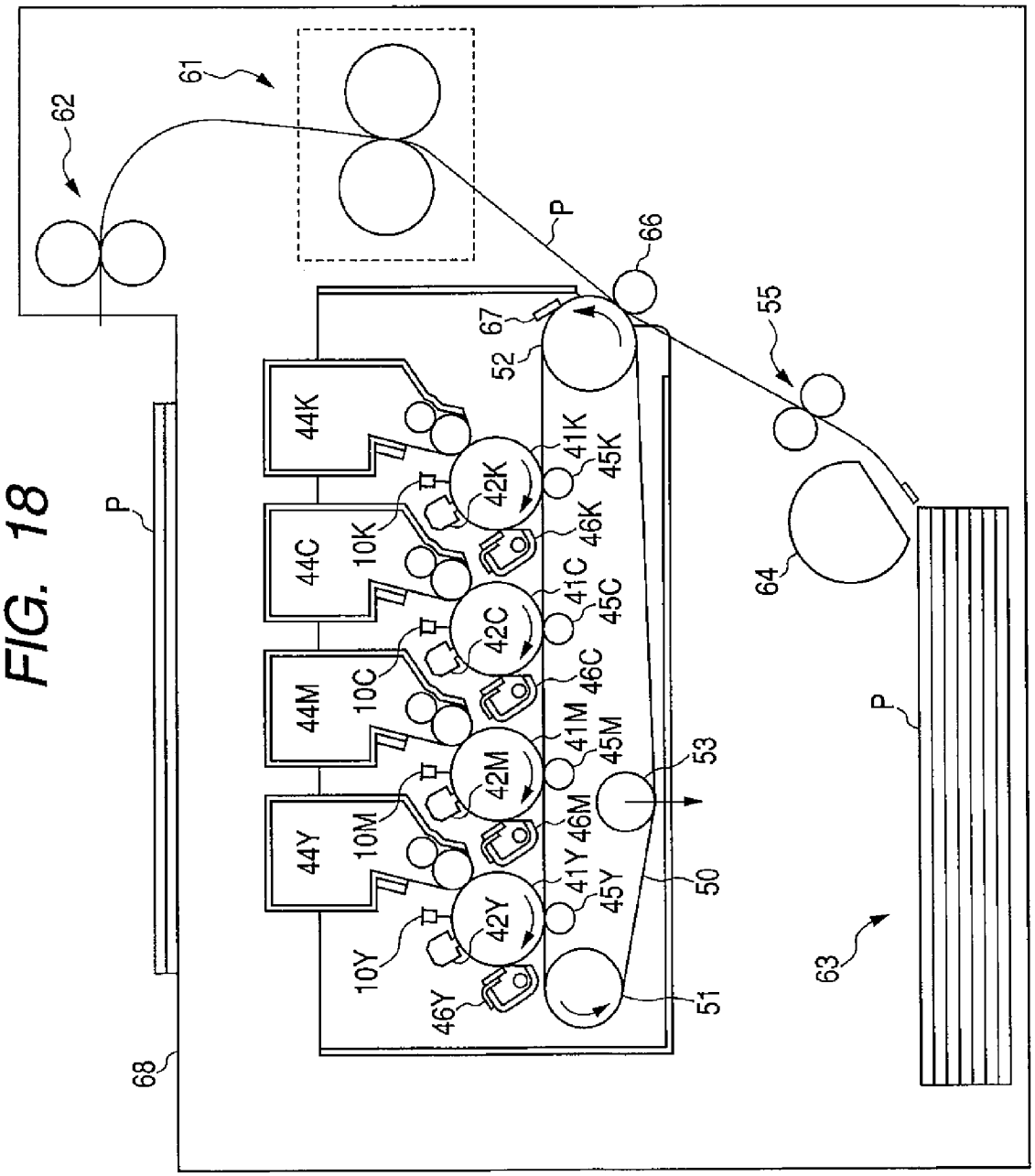
FIGS. 18 and 19 are schematic views showing examples of an image forming apparatus incorporating the line head according to any one of the above embodiments.

FIG. 18 shows an eleventh embodiment of the invention. The same components, are designated by the same reference numerals and repetitive explanations will be omitted.

In this embodiment, the element array 1a is first activated to form both the binary data image and the gradation data image, and the element array 1b is not used. However, after a predetermined time has passed, the element array 1a is used to form only the binary data image while the element array 1b is used to form only the gradation data image. As in the tenth embodiment, it is configured that the element arrays 1a and 1b are activated alternately.

Specifically, all the light emission elements in the element array 1a ere activated during the time period 0 to tp to form the binary data image and the gradation data image. All the light emission elements in the element array 1b are kept deactivated. When luminance decreases below a predetermined value due to the continuous activation of the element array 1a, the element array 1a is deactivated at the time point tp, and switching is made for the element array 1b to form the gradation data image. At the time point tq, the element array 1b is deactivated and the element array 1a is activated to form the binary data image for a short time until the time point tr. Because the activation time period of the element array 1a is short and only the binary data image is formed, deterioration of the obtained image quality poses no practical problem.

Thereafter, the gradation data image is formed by the element array 1b until the time point ts, the binary data image is formed by the element array 1a during the time period ts to tu, and the gradation data image is formed by the element array 1b during the time period tu to tv, in a repetitive manner. At the time point tv, because the temperature of the light emission elements in the element array 1a has sufficiently dropped and the luminance thereof has been sufficiently restored, the binary data image and the gradation data image are formed again.

Figure 17:
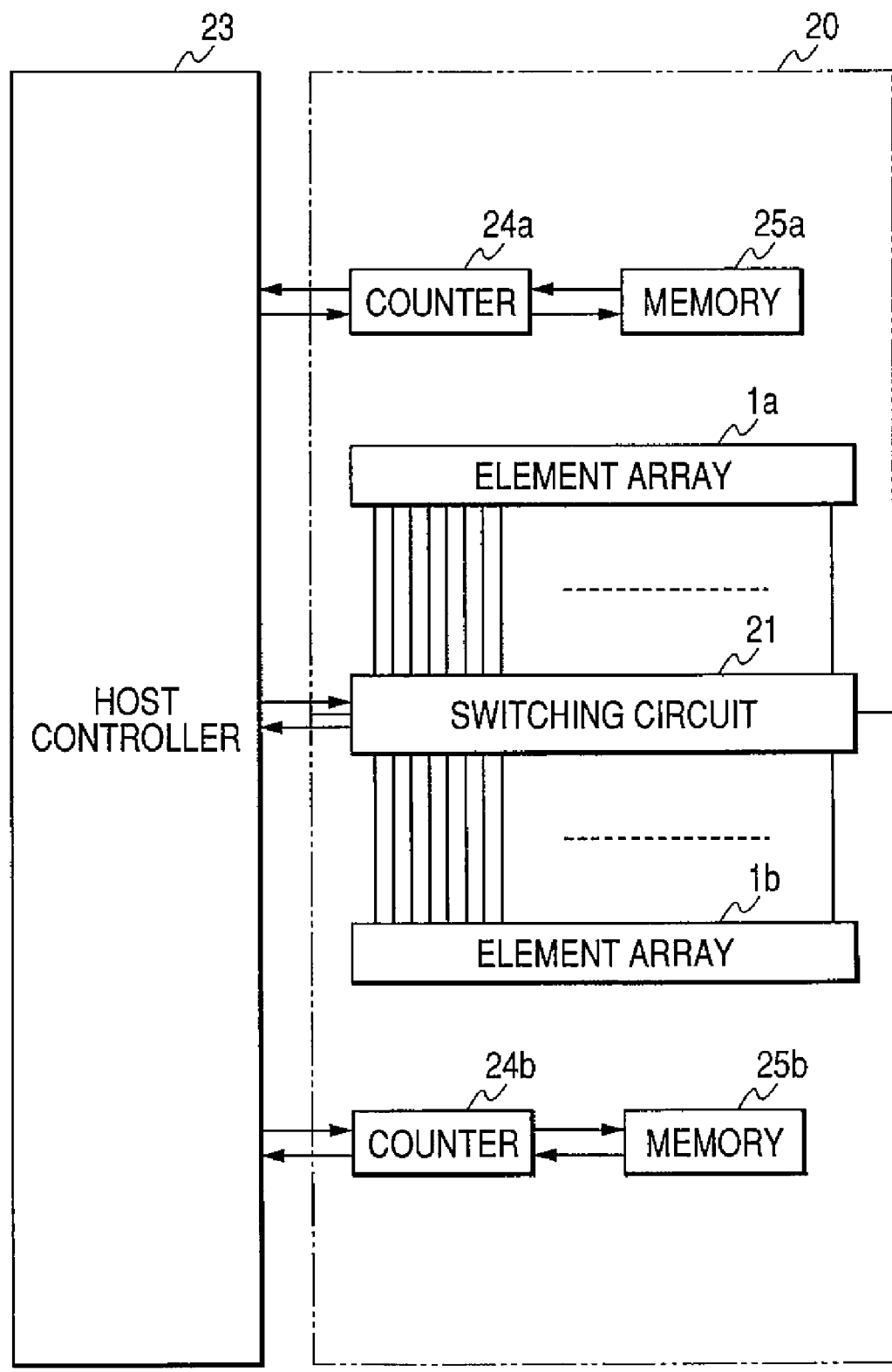
FIG. 17 is a block diagram of a peripheral configuration of the line head of FIG. 15 or 16.

FIG. 17 shows a peripheral configuration of the line head of the tenth and eleventh embodiments. In this embodiment, a counter 24a and a memory 25a are associated with the element array 1a. A counter 24b and a memory 25b are associated with the element array 1b.

The counter 24a courts the activated time period of the element array 1a, and stores the counted value into the memory 25a. In the memory 25a, switching timing data of the element array 1a is stored in advance. Similarly, the counter 24b counts the activated time period of the element array 1b, and stores the counted value into the memory 25b. In the memory 25b, switching timing data of the element array 1b is stored in advance. The host controller 23 judges whether the activated time periods of the element arrays 1a and 1b reach the switching timings stored in the memories 25a and 25b, respectively. Upon judging that the switching timing has reached for the element array that is activated, the host controller 23 sends a signal to the switching circuit 21 to switch to the activated element array to another one.

In this case, the host controller 23 controls the counters 24a and 24b and the memories 25a and 25b. However, a controller such as a CPU for controlling the counters 24a, 24b and the memories 25a, 25b may be provided in the control section 20, such that the controller is formed on a substrate on which the switching circuit 21 is provided. In this case, the configuration of the control system can be compact and the host controller 23 is not involved. Hence, the wiring can be shorter, which can in turn increase the processing speed.

The line head according to any one of the above embodiments can be applied to not only a monochromatic printer, but also a four-cycle type full color printer, and a tandem type full color printer. There will be described cases where the line head is incorporated in the full color printer.

FIG. 18 shows a tandem-type image forming apparatus in which four exposure heads 10k, 10C, 10M and 10Y having the same configuration comprising a number of organic EL elements are disposed so as to face exposure positions on four photosensitive drums (image carriers) 41k, 41C, 41M, and 41Y having the same configuration In the image forming apparatus, an intermediate transfer belt 50 stretched over a driving roller 51, a follower roller 52, and a tension roller 53 and circulated in a direction indicated, by an arrow in the drawing (counterclockwise direction) while being tensed by the tension roller 53. The photosensitive drums 41K, 41C, 41M, and 41Y, each having a photosensitive layer on the outer peripheral surface thereof, are placed at regular intervals with respect to the intermediate transfer belt 50. Capitals K, C, M and Y appended to the reference numerals stand for black, cyan, magenta, and yellow, respectively, and thereby indicate that they are photosensitive drums for black, cyan, magenta, and yellow, respectively. The same can be said for other members. The photosensitive drums 41K, 41C, 41M, and 41Y are rotated in a direction indicated by arrows in the drawing (clockwise direction) in synchronous with the circulation of the intermediate transfer belt 50.

On the periphery of the respective photosensitive drums 41 (K, C, M, and Y) are provided corona chargers 42 (K, C, M, and Y) for uniformly charging the outer peripheral surfaces of the respective photosensitive drums 41 (K, C, M, and Y), and the exposure heads 10 (K, C, M, and Y) for scanning the outer peripheral surfaces that have been charged uniformly by the corona chargers 42 (K, C, M, and Y), in synchronous with the rotations of the photosensitive drums 41 (K, C, M, and Y) to form electrostatic latent images thereon.

The image forming apparatus further comprises: developers 44 (K, C, M, and Y) to develop the electrostatic latent images as visible images with toner; primary transfer rollers 45 (K, C, M, and Y) for sequentially transferring the toner images developed by the developers 44 (K, C, M, and Y) onto the Intermediate transfer belt 50 (primary transfer); and cleaners 46 (K, C, M, and Y) for removing toner remaining on the surfaces of the photosensitive drums 41 (K, C, M, and Y) after the primary transfer.

In each of the respective exposure heads 10 (K, C, M, and Y), the organic EL elements are arrayed in a direction parallel to a generatrix of the photosensitive drums 41 (K, C, M, and Y). The peak energy wavelengths of light emitted from the respective exposure heads 10 (K, C, M, and Y) are almost matched with the peak sensitivity wavelengths of the photosensitive drums 41 (K, C, M, and Y).

In the developer 44 (K, C, M, and Y), non-magnetic one-component toner is transported to a developing roller by a feeding roller. The thickness of the toner adhering to the surface of the developing roller is restricted by a control blade. The developing roller is brought into contact with or pressed against the photosensitive drum 41 (K, C, M, and Y) to adhere the toner thereon according to the potential levels of the photosensitive drums 41 (K, C, M, and Y). A toner image is thus developed.

The respective toner images of black, cyan, magenta, and yellow are sequentially transferred onto the intermediate transfer belt 50 by primary transfer biases applied to the primary transfer rollers 45 (K, C, M, and Y), and are sequentially superimposed on the intermediate transfer belt 50 to form a full color toner image, which is secondary transferred onto a recording medium P, such as paper, by a secondary transfer roller 66 at a secondary transfer position. The toner image is then fixed onto the recording medium P by passing through a pair of fixing rollers 61. The recording medium P is finally ejected by a pair of ejection rollers 62 onto a tray 68 formed at the top portion of the apparatus.

The image forming apparatus further comprises: a feeding cassette 63 in which a number of recording media P are held in a stacked manner; a pickup roller 64 to feed the recording media P from the feeding cassette 63 one by one; a pair of gate rollers 65 to regulate the feeding timing of a recording medium P to the secondary transfer position; and a cleaning blade 67 for removing toner remaining on the surface of the intermediate transfer belt 50 after the secondary transfer.

In a case where the above-described line head 10 is incorporated in the image forming apparatus as the exposer, it is possible to downsize the apparatus in comparison with a case where a laser scanning optical system is used.

Figure 19:
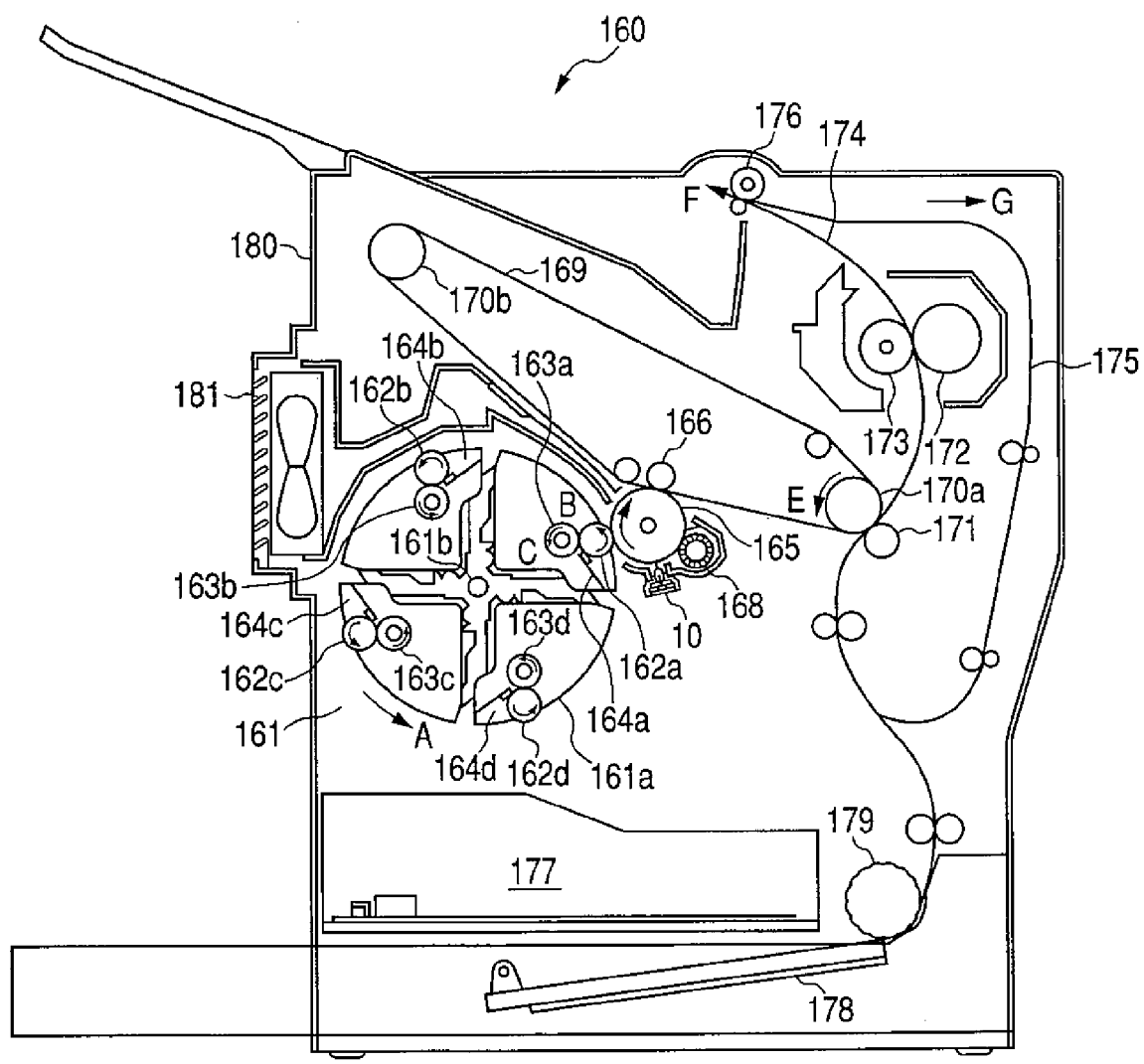
Figure 20:
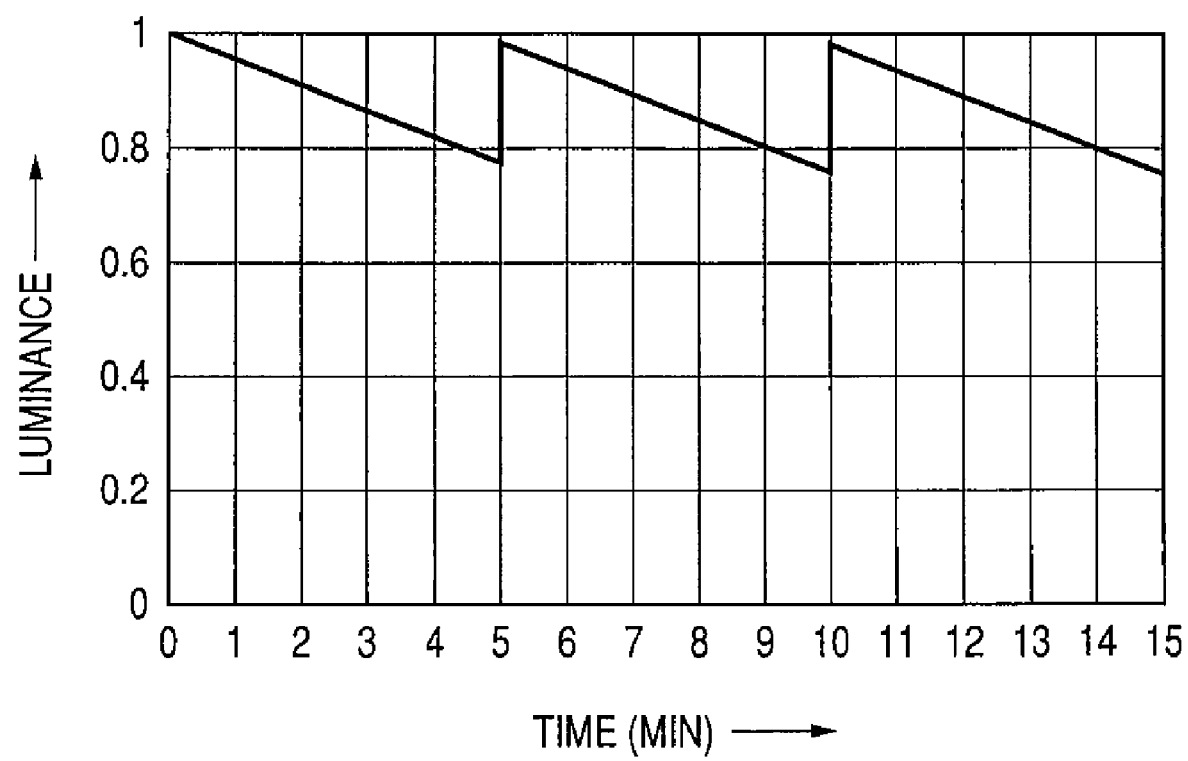
FIG. 20 is a graph showing a time-luminance characteristic of an electroluminescence element.

FIG. 19 shows a four-cycle type image forming apparatus 160 roughly comprising a rotary-type developer 161; a photosensitive drum (image carrier) 165; an exposure head 10 comprising organic EL elements; an intermediate transfer belt 169; a sheet transportation path 174; and a sheet feeding tray 178.

In the developer 161, a rotary 161a rotates about an axis 161b in a direction indicated by an arrow A. The interior of the rotary 161a is divided into four segments, in which are respectively formed image forming units for four colors, including yellow (Y), cyan (C), magenta (M), and black (K). Developing rollers 162a through 162d are respectively placed in the image forming units for four colors, to rotate in a direction indicated by an arrow B. Toner supply rollers 163a through 163d is rotated in a direction indicated by an arrow C. Control blades 164a through 164d to restrict the thickness of toner on the developing rollers 162a through 162d to a predetermined thickness.

The image forming apparatus 160 further comprises a primary transfer member 166; and a charger 168. The photosensitive drum 165 is rotated by an unillustrated driving motor such as a step motor, in a direction indicated by an arrow D, which is opposite to the rotary direction of the developing roller 162a.

The intermediate transfer belt 169 is stretched over a driving roller 170a and a follower roller 170b. The driving roller 170a is linked to a driving motor of the photosensitive drum 165, so that the intermediate transfer belt 169 is circulated in a direction indicated by an arrow E, which is opposite to the direction of the photosensitive drum 165.

The sheet transportation path 174 is provided with a plurality of transportation rollers and a pair of ejection rollers 176. The toner image carried by the intermediate transfer belt 169 is transferred onto one surface of a sheet of paper by a secondary transfer roller 171 at the secondary transfer position.

The sheet of paper, onto which the toner image has been transferred as described above, is then subjected to fixing processing at a fuser. The fuser is provided with a heating roller 172 and a press roller 173. After the fixing processing, the sheet of paper is pulled into the pair of ejection rollers 176 to travel in a direction indicated by an arrow F. When the pair of ejection rollers 176 rotates in an inverse direction from this state, the sheet of paper inverts the direction and travels in a direction indicated by an arrow G through a double-sided print transportation path 175. Numeral 177 denotes an electrical equipment box, and numeral 179 denotes a pickup roller provided at the outlet of the feeding tray 178.

For the sheet transportation path, for example, a low-speed brushless motor is used as the driving motor to drive the transportation rollers. Also, a step motor is used for the intermediate transfer belt 169 due to a need to correct color shift or the like. These motors are controlled by signals from an unillustrated controller.

In the state shown in the drawing, an electrostatic latent image of yellow (Y) is formed on the photosensitive drum 165, and an image of yellow is formed on the photosensitive drum 165 when a high voltage is applied to the developing roller 162a. When images of yellow on the back surface and the front surface are entirely carried over onto the intermediate transfer belt 169, the developing rotary 161a rotates by 90 degrees in a direction indicated by the arrow A.

The intermediate transfer belt 169 rotates once and returns to the position of the photosensitive drum 165. Images of cyan (C) on two surfaces are then formed on the photosensitive drum 165, which are carried over to be superimposed on the images of yellow being carried on the intermediate transfer bolt 169. Thereafter, the processing is repeated in the same manner, so that the developing rotary 161 rotates by 90 degrees and the intermediate transfer belt 169 rotates once after the images are carried over.

For images of four colors to be carried over, the intermediate transfer belt 169 rotate four times, after which the rotational position is controlled for the image to be transferred onto a sheet of paper at the position of the secondary transfer roller 171. A sheet of paper fed from the feeding tray 178 is transported through the transportation path 174, and the color image is transferred onto one surface of the sheet of paper at the position of the secondary transfer roller 171. The sheet of paper bearing the transferred image on one surface is inverted by the pair of ejection rollers 176 as described above, and stands by in the transportation path. Subsequently, the sheet of paper is transported to the position of the secondary transfer, roller 171 at the adequate timing, and the color image is transferred onto the other surface. A housing 180 is provided with an exhaust fan 181.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A line head, comprising:

a plurality of element arrays arranged in a secondary scanning direction, each array including a plurality of light emission elements arrayed in a primary scanning direction; and a first switcher, which activates the element array in at least one of the element arrays while deactivating the others, wherein the first switcher sequentially activates at least one of the element arrays when a predetermined requirement is satisfied, each of the light emission elements is provided as either an organic electroluminescence element or a light emitting diode, and the first switcher controls a potential at a cathode of each of the light emission elements.

2. The line head as set forth in claim 1, wherein at least one of the element arrays is used for a backup purpose.

3. The line head as set forth in claim 1, wherein the first switcher comprises switching transistors.

4. The line head as set forth in claim 3, wherein:

the element arrays includes at least one first element array and at least one second element array;

the switching transistors includes a first transistor associated with the first element array and a second transistor associated with the second element array and having a conductive type which is opposite to the first transistor; and the first switcher inputs a common signal to the first transistor and the second transistor, so that one of the first transistor and the second transistor is activated while the other one is deactivated.

5. A line head, comprising:

a plurality of element arrays arranged in a secondary scanning direction, each array including a plurality of light emission elements arrayed in a primary scanning direction; and a first switcher, which activates the element array in at least one of the element arrays while deactivating the others, wherein the first switcher sequentially activates at least one of the element arrays when predetermined requirement is satisfied, each of the light emission elements is provided as either an organic electroluminescence element or a light emitting diode, and the first switcher controls a potential at an anode of each of the light emission elements.

6. The line head as set forth in claim 5, wherein the first switcher comprises switching transistors.

7. The line head as set forth in claim 6, wherein:

each of the element arrays is associated with one of the switching transistors; and the first switcher simultaneously generates a first signal for activating the switching transistor and a second signal for deactivating the switching transistor; so that the first signal is inputted to the switching transistor for the at least one element arrays to be activated, while the second signal is inputted to the switching transistor for the others to be deactivated.

8. An image forming apparatus, comprising:

an image carrier, having a photosensitive surface;

a line head, comprising:

a plurality of element arrays arranged in a secondary scanning direction, each array including a plurality of light emission elements arrayed in a primary scanning direction; and a first switcher, which activates the element array in at least one of the element arrays while deactivating the others; and a developer, which develops the latent image as a visible image with toner, wherein the first switcher sequentially activates at least one of the element arrays when a predetermined requirement is satisfied, the first switcher comprises switching transistors, each of the element arrays is associated with one of the switching transistors, and the first switcher simultaneously generates a first signal for activating the switching transistor and a second signal for deactivating the switching transistor, so that the first signal is inputted to the switching transistor for the at least one of the element arrays to be activated, while the second signal is inputted to the switching transistor for the others to be deactivated.

* * * * *